(12) United States Patent
Kim et al.

(10) Patent No.: US 12,368,893 B2
(45) Date of Patent: *Jul. 22, 2025

(54) METHOD FOR PERFORMING TRANSFORM INDEX CODING ON BASIS OF INTRA PREDICTION MODE, AND DEVICE THEREFOR

(71) Applicant: LG ELECTRONICS INC., Seoul (KR)

(72) Inventors: Seunghwan Kim, Seoul (KR); Medhi Salehifar, Seoul (KR); Moonmo Koo, Seoul (KR); Jaehyun Lim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/616,972

(22) Filed: Mar. 26, 2024

(65) Prior Publication Data

US 2024/0244261 A1 Jul. 18, 2024

Related U.S. Application Data

(63) Continuation of application No. 18/133,799, filed on Apr. 12, 2023, now Pat. No. 11,979,609, which is a continuation of application No. 17/729,597, filed on Apr. 26, 2022, now Pat. No. 11,677,986, which is a continuation of application No. 15/734,806, filed as application No. PCT/KR2019/006895 on Jun. 7, 2019, now Pat. No. 11,356,702.

(60) Provisional application No. 62/681,631, filed on Jun. 6, 2018.

(51) Int. Cl.
*H04N 19/61* (2014.01)
*H04N 19/11* (2014.01)
*H04N 19/176* (2014.01)
*H04N 19/593* (2014.01)

(52) U.S. Cl.
CPC ............ *H04N 19/61* (2014.11); *H04N 19/11* (2014.11); *H04N 19/176* (2014.11); *H04N 19/593* (2014.11)

(58) Field of Classification Search
CPC ...... H04N 19/61; H04N 19/11; H04N 19/176; H04N 19/593
USPC ..................................................... 375/240.12
See application file for complete search history.

(56) References Cited

U.S. PATENT DOCUMENTS

2011/0248873 A1* 10/2011 Karczewicz ......... H04N 19/196
341/67

* cited by examiner

*Primary Examiner* — Nguyen T Truong
(74) *Attorney, Agent, or Firm* — Bryan Cave Leighton Paisner LLP

(57) ABSTRACT

The present disclosure, in a method of decoding a video signal, provides a method including checking whether a transform skip is applied to a current block; acquiring a transform index indicating transform types applied to a horizontal direction and a vertical direction of the current block from among a plurality of predefined transform types from the video signal when the transform skip is not applied to the current block; and performing an inverse primary transform on the current block using the transform types indicated by the transform index, wherein the transform types applied to the horizontal direction and the vertical direction of the current block are determined from among transform types defined according to an intra prediction mode of the current block based on the transform index.

9 Claims, 22 Drawing Sheets

[FIG. 1]
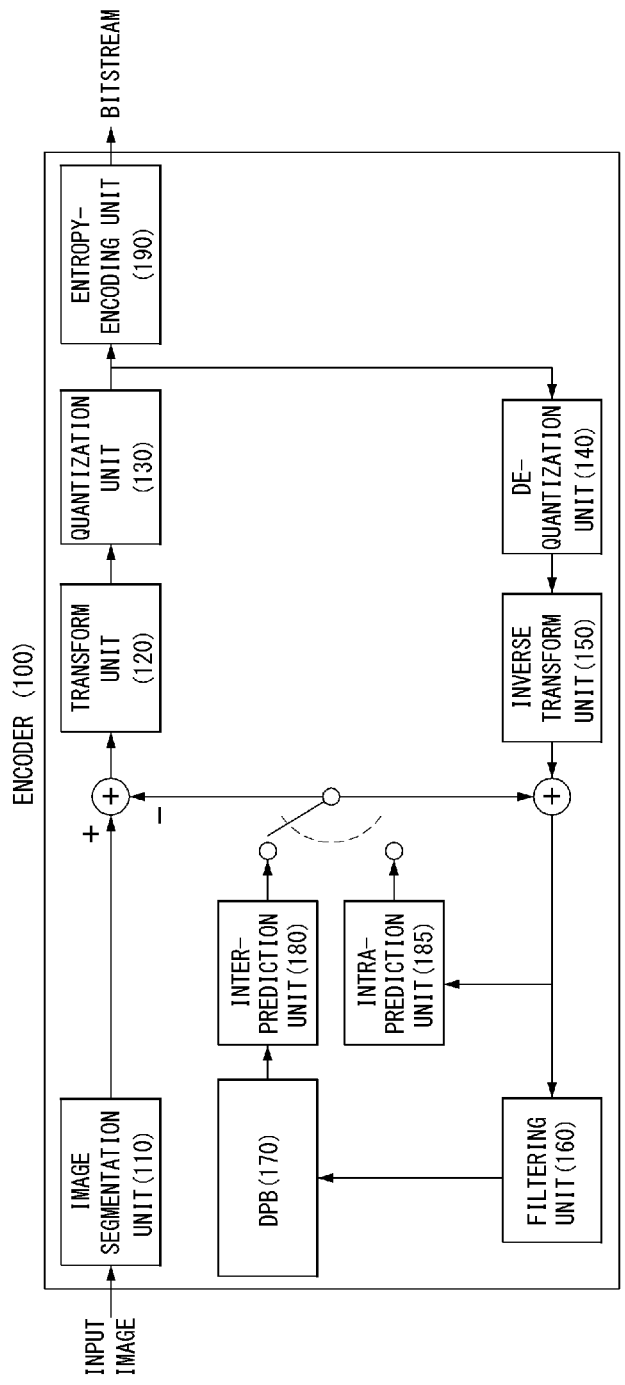

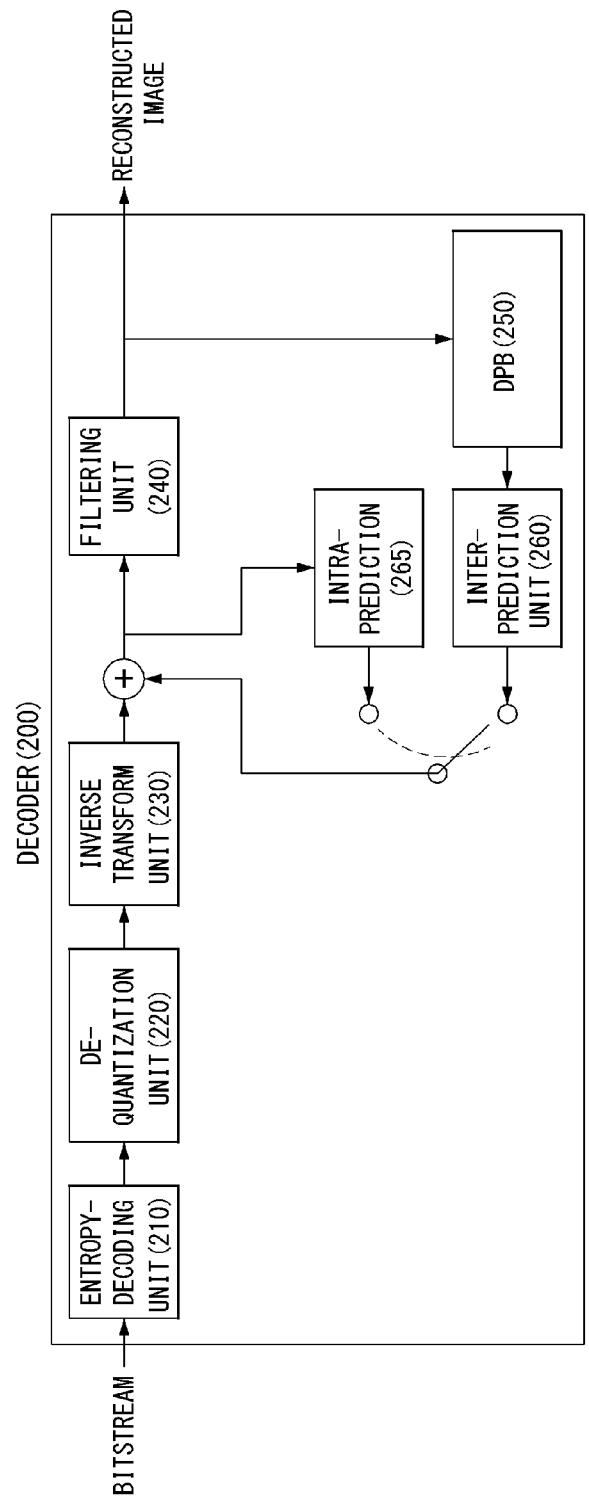
[FIG. 2]

[FIG. 3A]
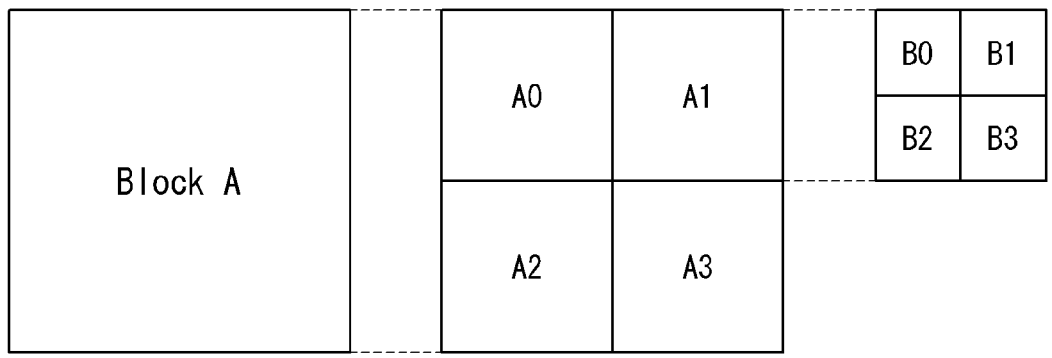
[FIG. 3B]
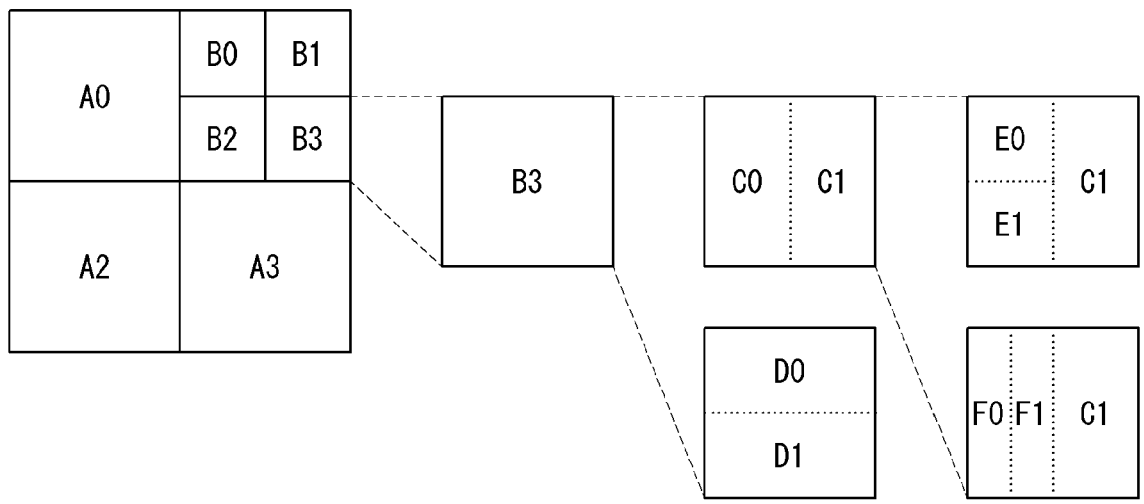

[FIG. 3C]
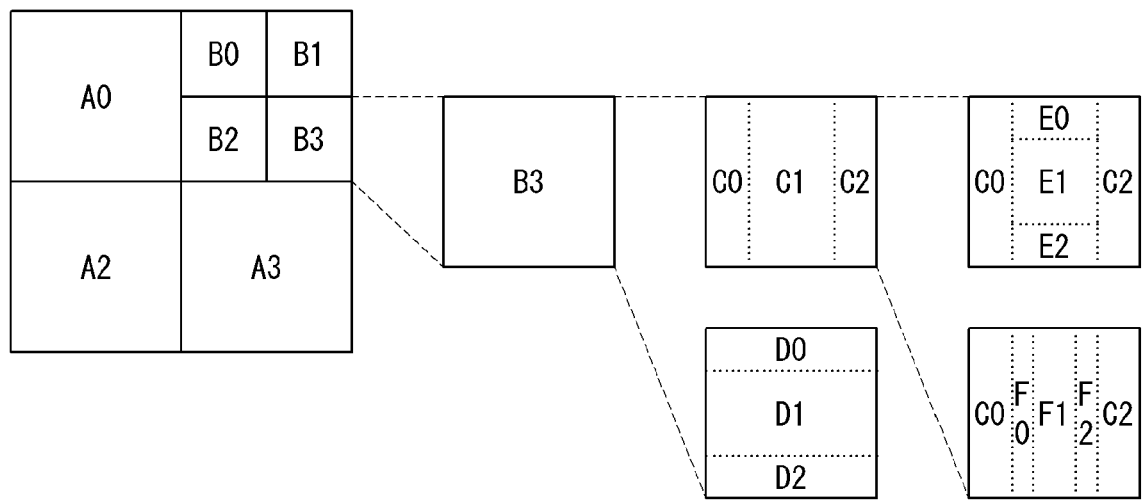
[FIG. 3D]
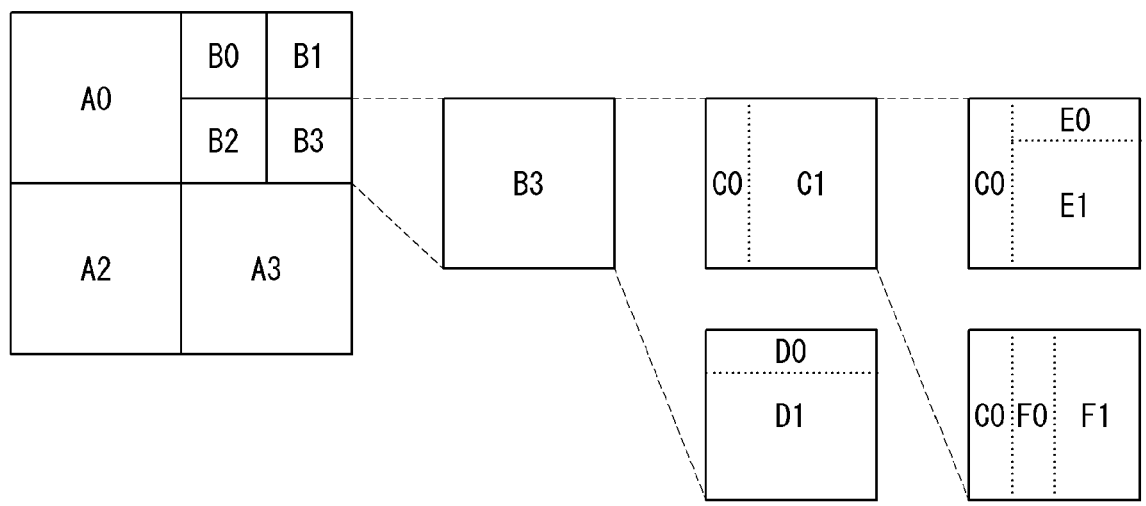

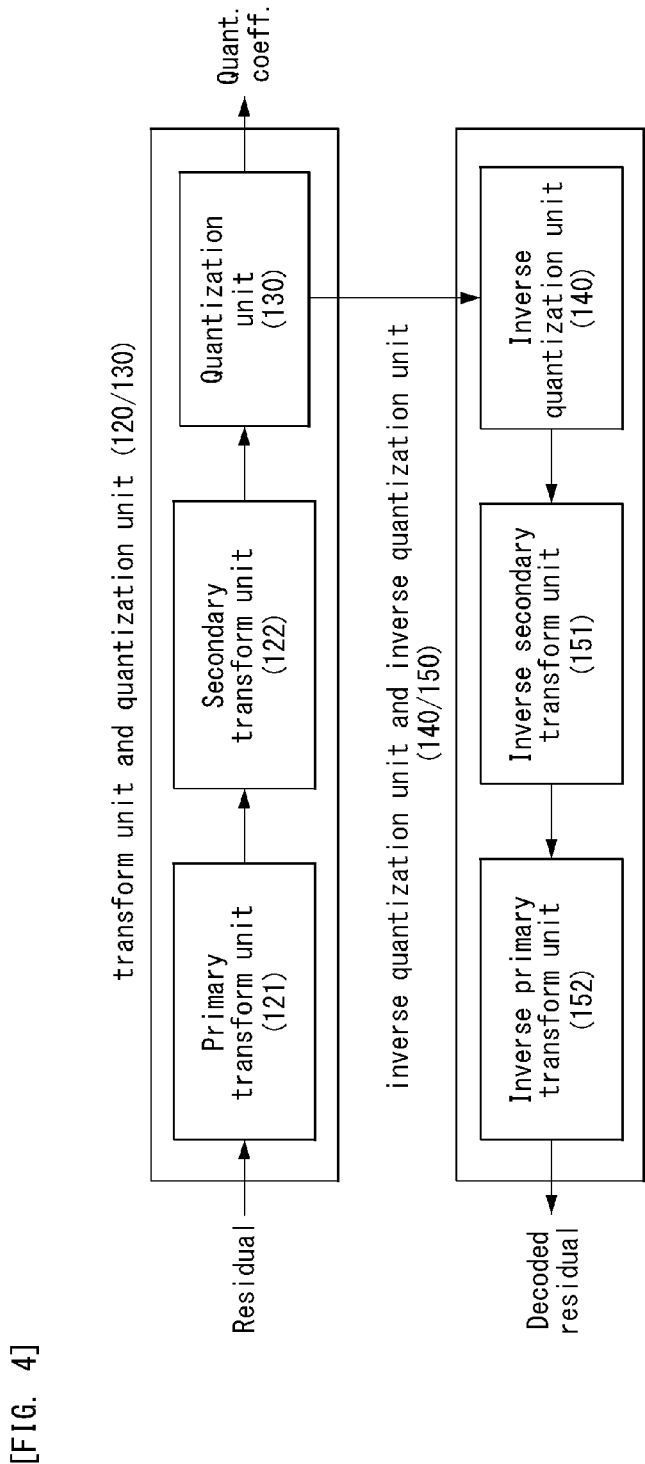
[FIG. 4]

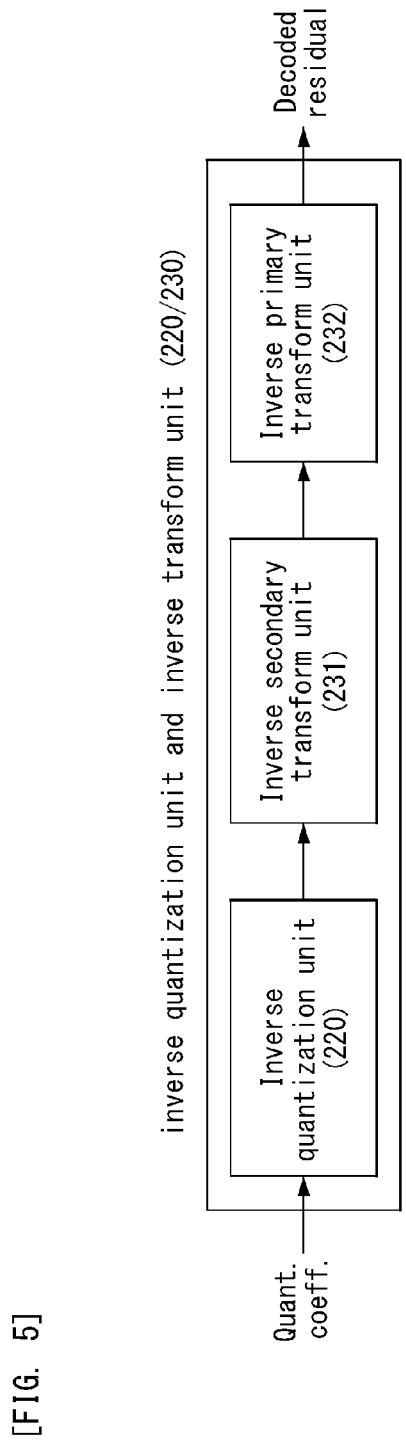

[FIG. 6]

| Configuration group | Index | Horizontal (row) transform | Vertical (column) transform | 35 intra Prediction modes | 67 intra Prediction modes |
|---|---|---|---|---|---|
| Group 0 (G0) | 0 | DST7 | DST7 | 0 | 0 |
| | 1 | DCT5 | DST7 | | |
| | 2 | DST7 | DCT5 | | |
| | 3 | DCT5 | DCT5 | | |
| Group 1 (G1) | 0 | DST7 | DST7 | 1, 3, 5, 7, 13, 15, 17, 19, 21, 23, 29, 31, 33 | 1, 3, 5, 7, 9, 11, 13, 23, 25, 27, 29, 31, 33, 35, 37, 39, 41, 43, 45, 55, 57, 59, 61, 63, 65 |
| | 1 | DST1 | DST7 | | |
| | 2 | DST7 | DST1 | | |
| | 3 | DST1 | DST1 | | |
| Group 2 (G2) | 0 | DST7 | DST7 | 2, 4, 6, 14, 16, 18, 20, 22, 30, 32, 34 | 2, 4, 6, 8, 10, 12, 24, 26, 28, 30, 32, 34, 36, 38, 40, 42, 44, 56, 58, 60, 64, 66 |
| | 1 | DCT8 | DST7 | | |
| | 2 | DST7 | DCT8 | | |
| | 3 | DCT8 | DCT8 | | |
| Group 3 (G3) | 0 | DST7 | DST7 | 8, 9, 10, 11, 12 (Neighboring angles to horizontal directions) | 14, 15, 16, 17, 18, 19, 20, 21, 22 (Neighboring angles to horizontal directions) |
| | 1 | DCT5 | DST7 | | |
| | 2 | DST7 | DCT8 | | |
| | 3 | DCT5 | DCT8 | | |
| Group 4 (G4) | 0 | DST7 | DST7 | 24, 25, 26, 27, 28 (Neighboring angles to vertical directions) | 46, 47, 48, 49, 50, 51, 52, 53, 54 (Neighboring angles to vertical directions) |
| | 1 | DCT8 | DST7 | | |
| | 2 | DST7 | DCT5 | | |
| | 3 | DCT8 | DCT5 | | |
| Group 5 (G5) | 0 | DCT8 | DCT8 | Inter prediction | Inter prediction |
| | 1 | DST7 | DCT8 | | |
| | 2 | DCT8 | DST7 | | |
| | 3 | DST7 | DST7 | | |

[FIG. 7]
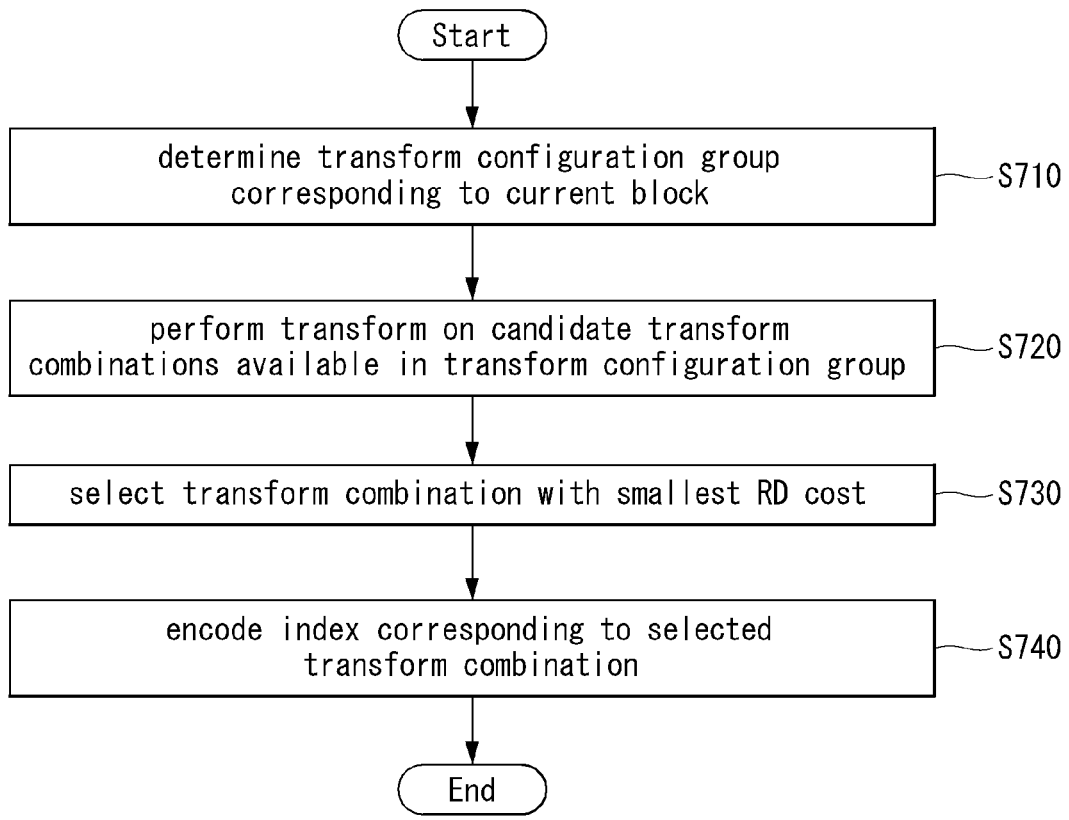

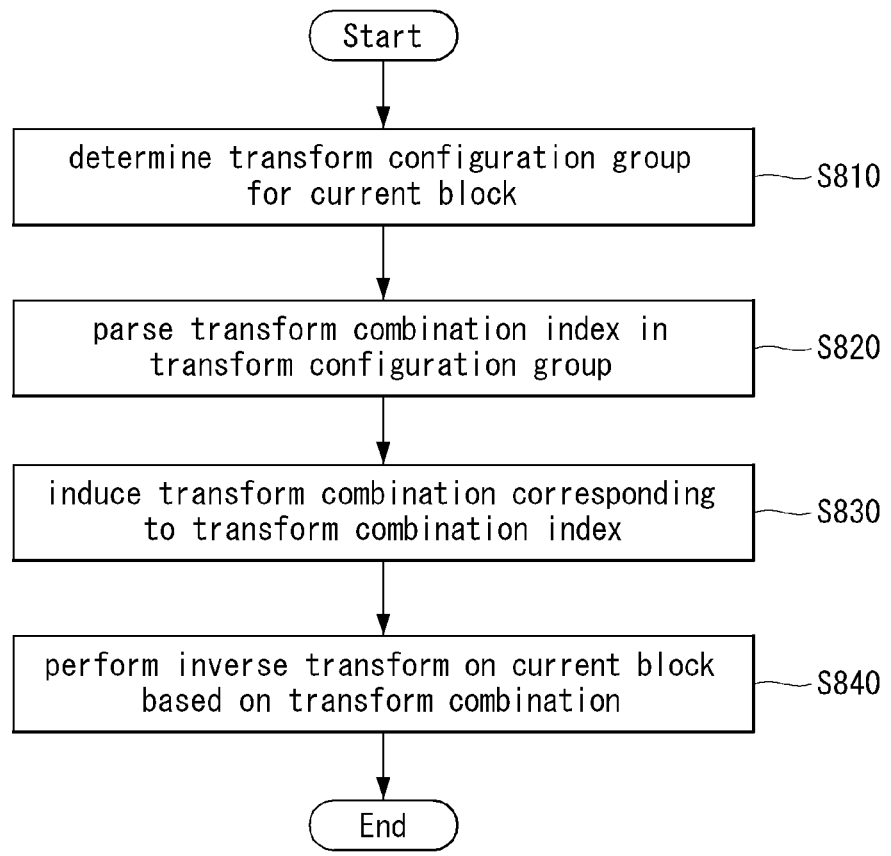
[FIG. 8]

[FIG. 9]
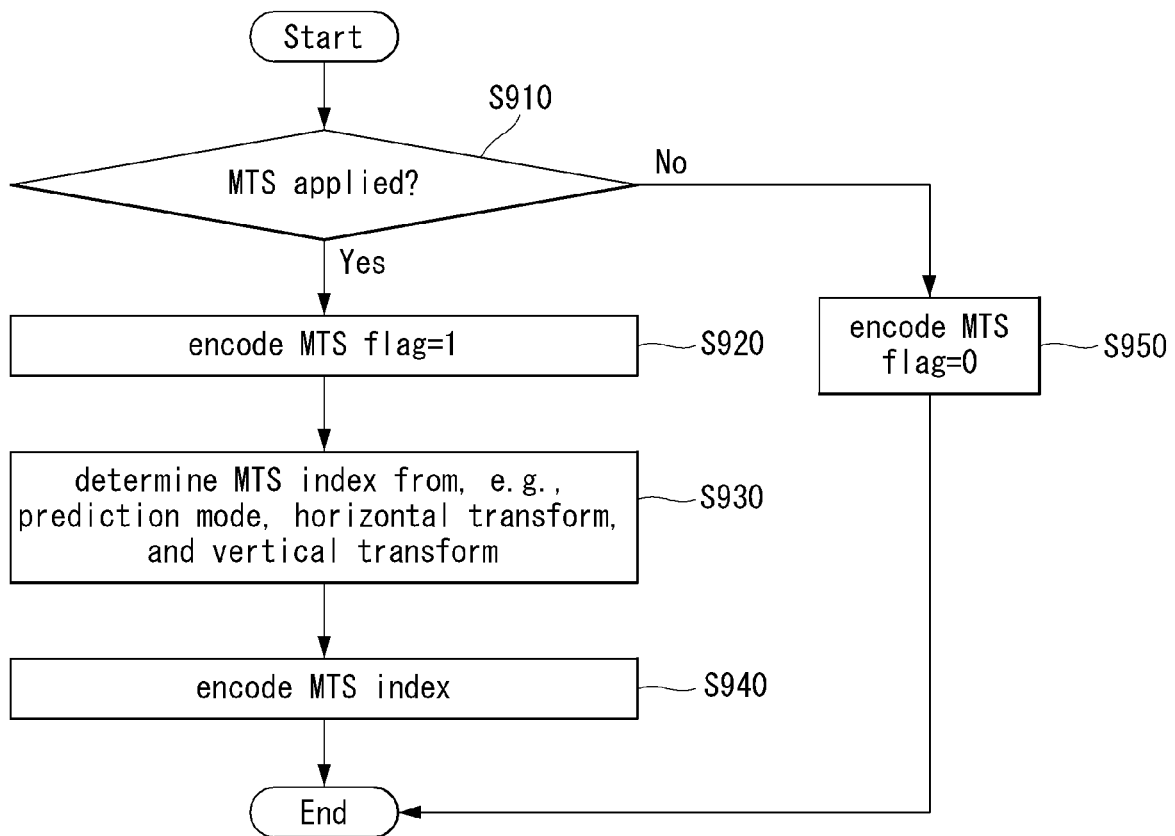

[FIG. 10]
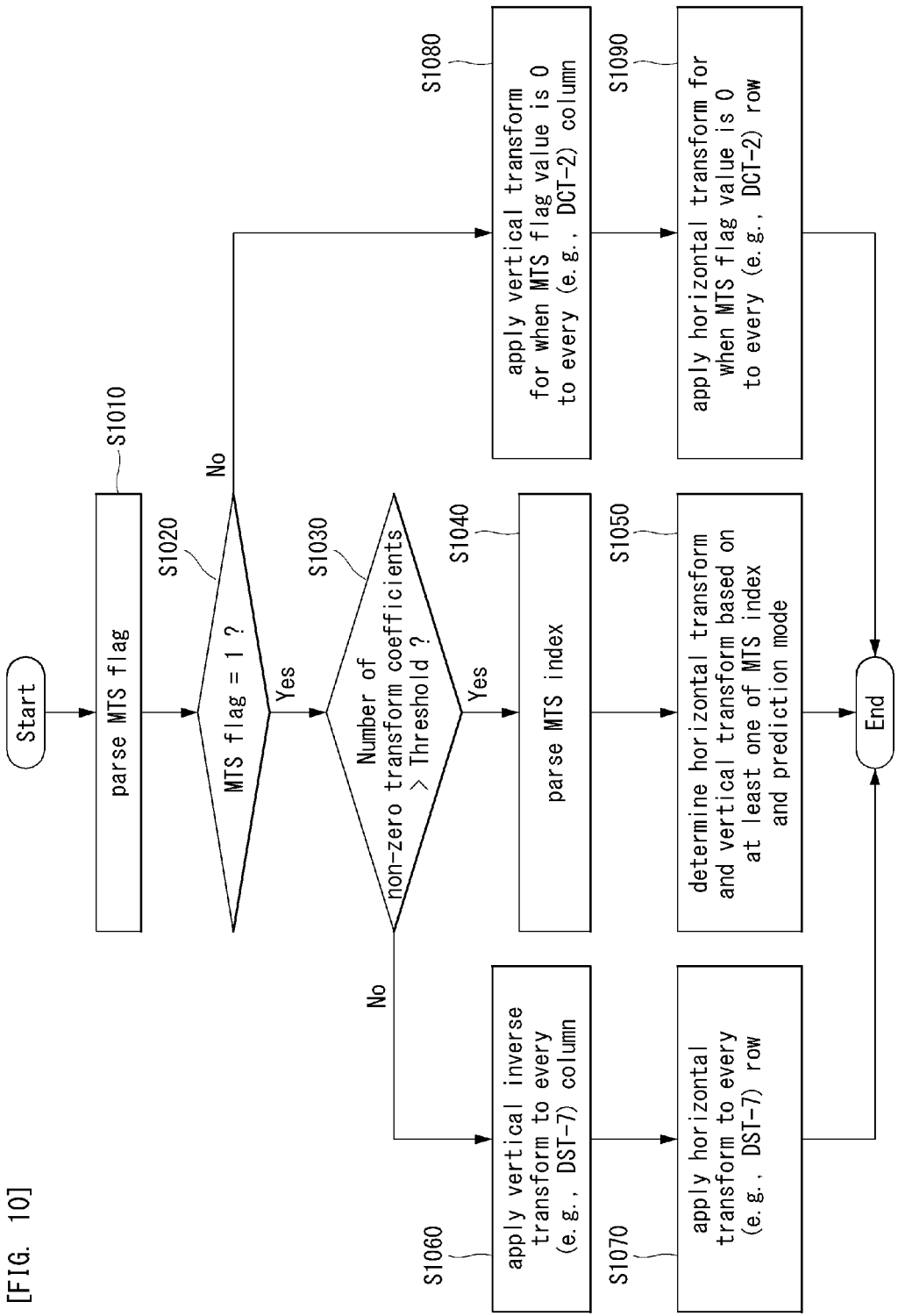

[FIG. 11]
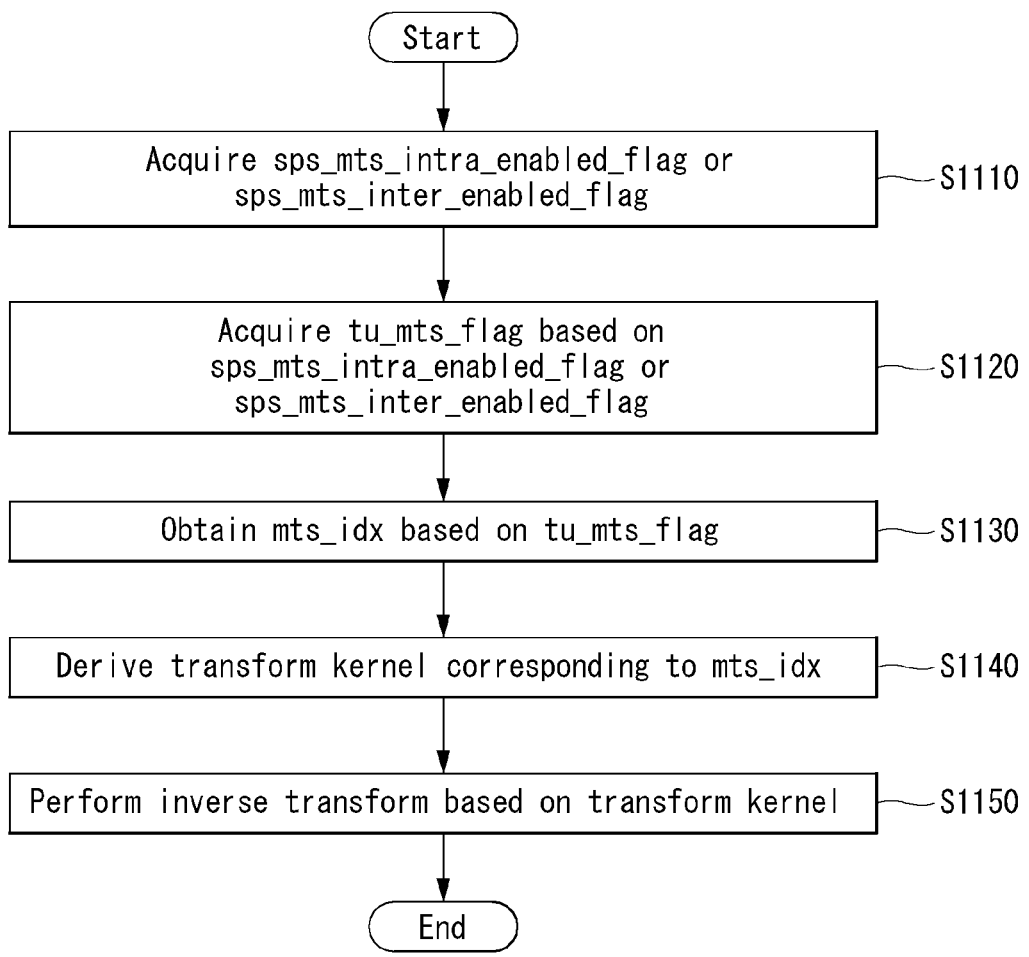

[FIG. 12]
| intra mode | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 |
|---|---|---|---|---|---|---|---|---|---|---|---|---|---|---|---|---|---|---|---|---|---|---|---|---|---|---|---|---|---|---|---|---|---|---|
| set | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 |
| intra mode | 34 | 35 | 36 | 37 | 38 | 39 | 40 | 41 | 42 | 43 | 44 | 45 | 46 | 47 | 48 | 49 | 50 | 51 | 55 | 53 | 54 | 55 | 56 | 57 | 58 | 59 | 60 | 61 | 62 | 63 | 64 | 65 | 66 | 67 (LM) |
| set | 34 | 33 | 32 | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | NULL |
[FIG. 13]
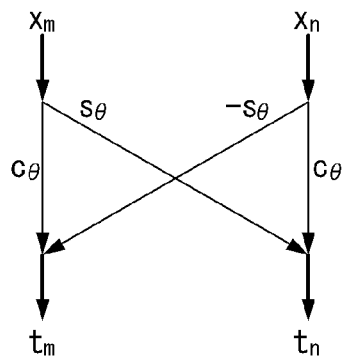

[FIG. 14]
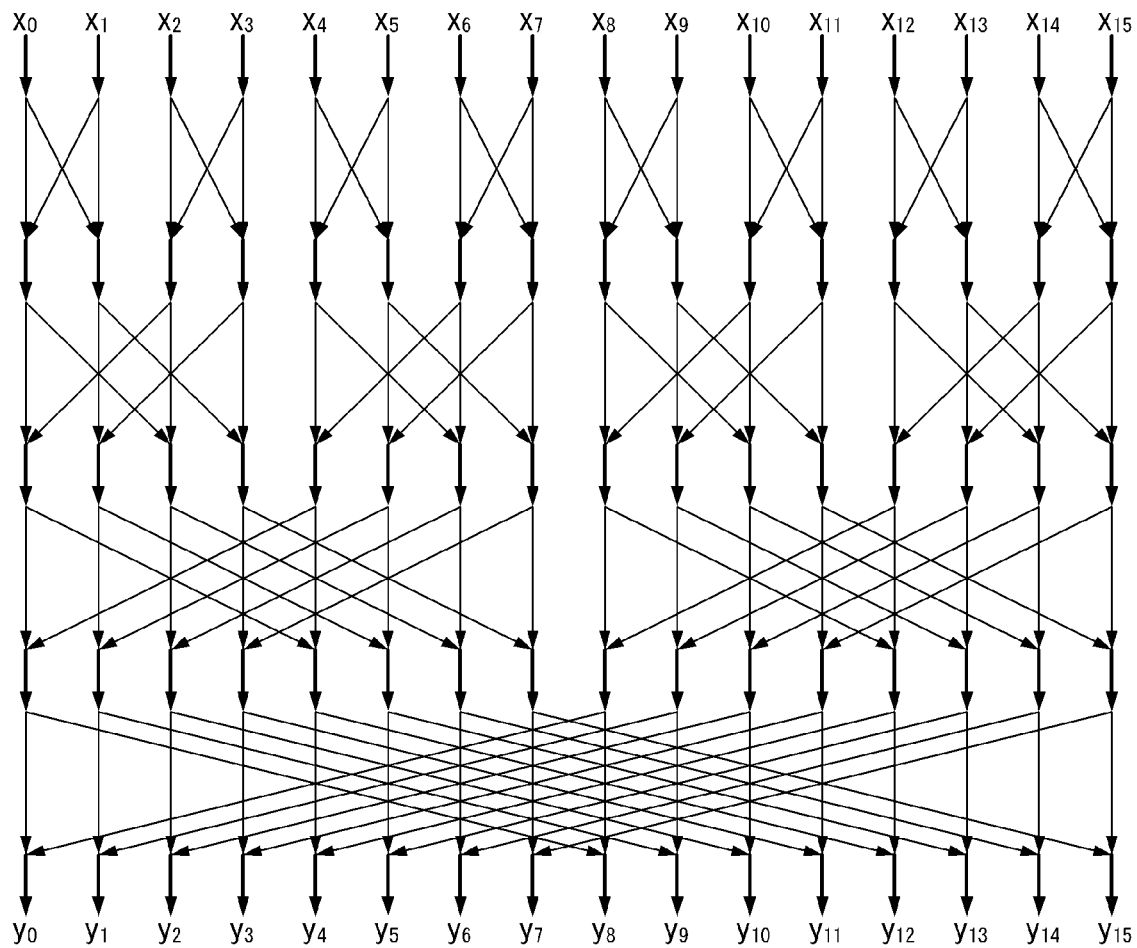

[FIG. 15]
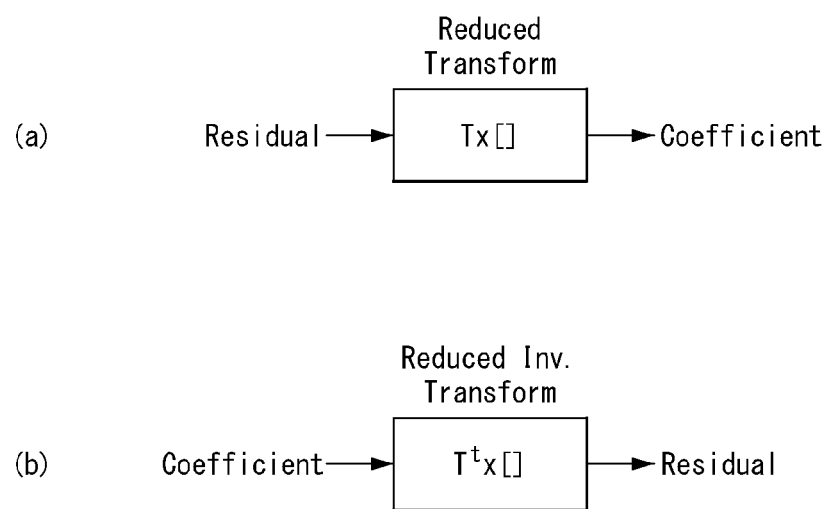

[FIG. 16]
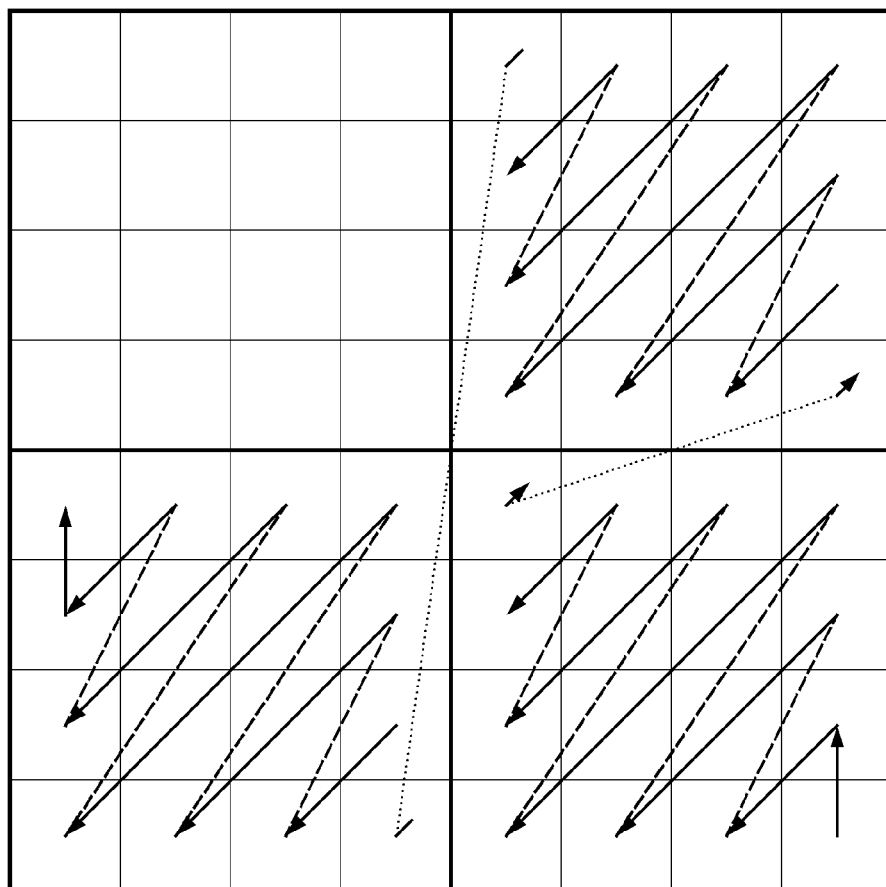
[FIG. 17]
| 1 | 3 | 6 | 10 |
|---|---|---|---|
| 2 | 5 | 9 | 13 |
| 4 | 8 | 12 | 15 |
| 7 | 11 | 14 | 16 |
(a)
| 1 | 2 | 3 | 4 |
|---|---|---|---|
| 5 | 6 | 7 | 8 |
| 9 | 10 | 11 | 12 |
| 13 | 14 | 15 | 16 |
(b)
| 1 | 5 | 9 | 13 |
|---|---|---|---|
| 2 | 6 | 10 | 14 |
| 3 | 7 | 11 | 15 |
| 4 | 8 | 12 | 16 |
(c)

[FIG. 18]
[FIG. 19]
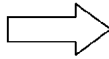
(a)                      (b)

[FIG. 20]
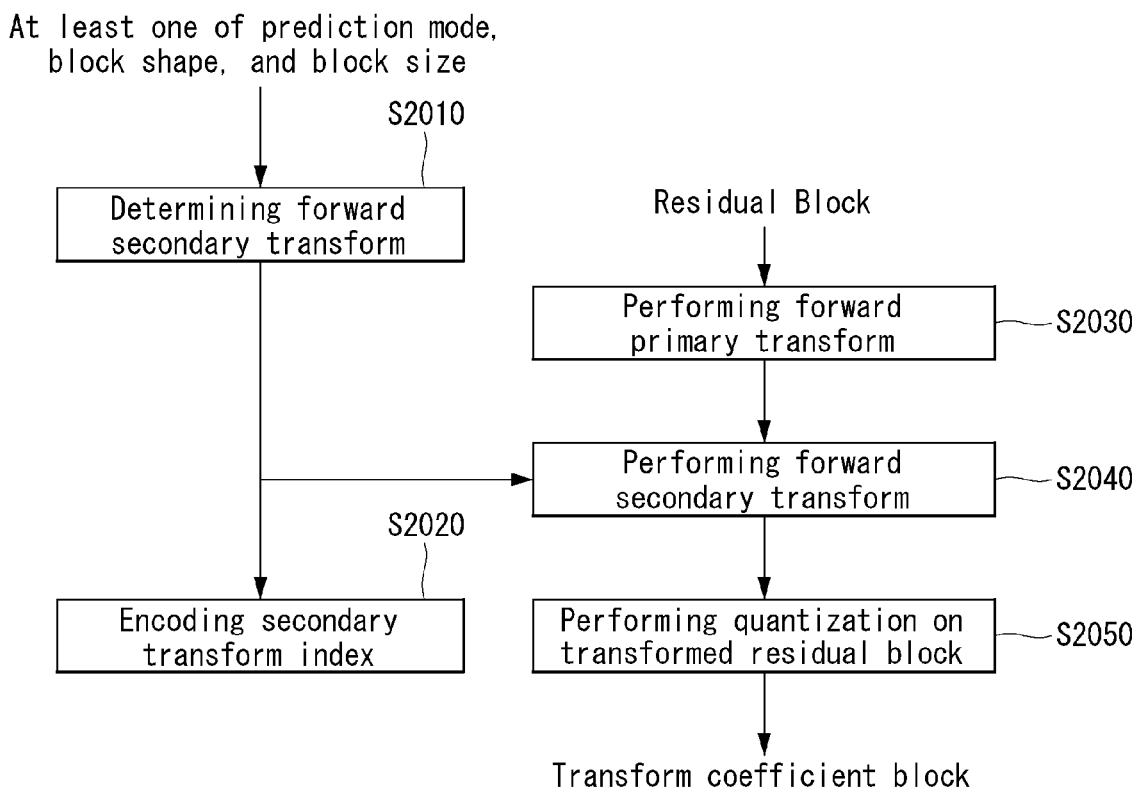

[FIG. 21]
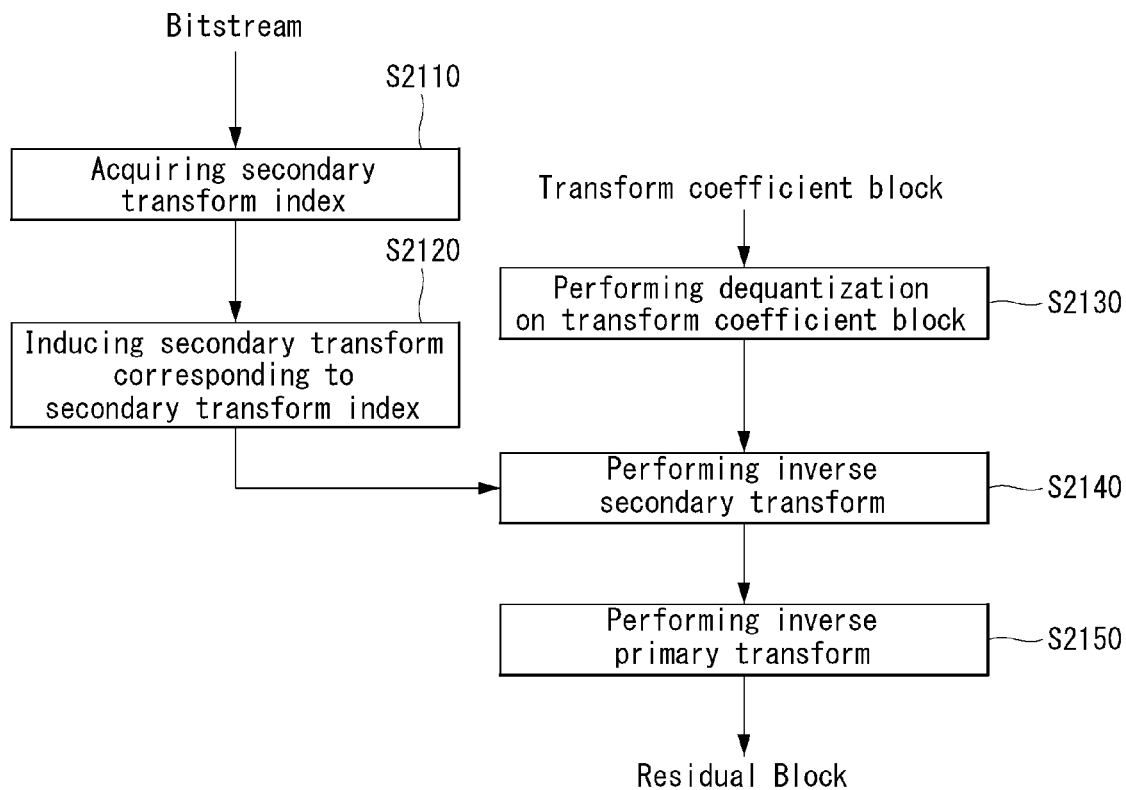
[FIG. 22]
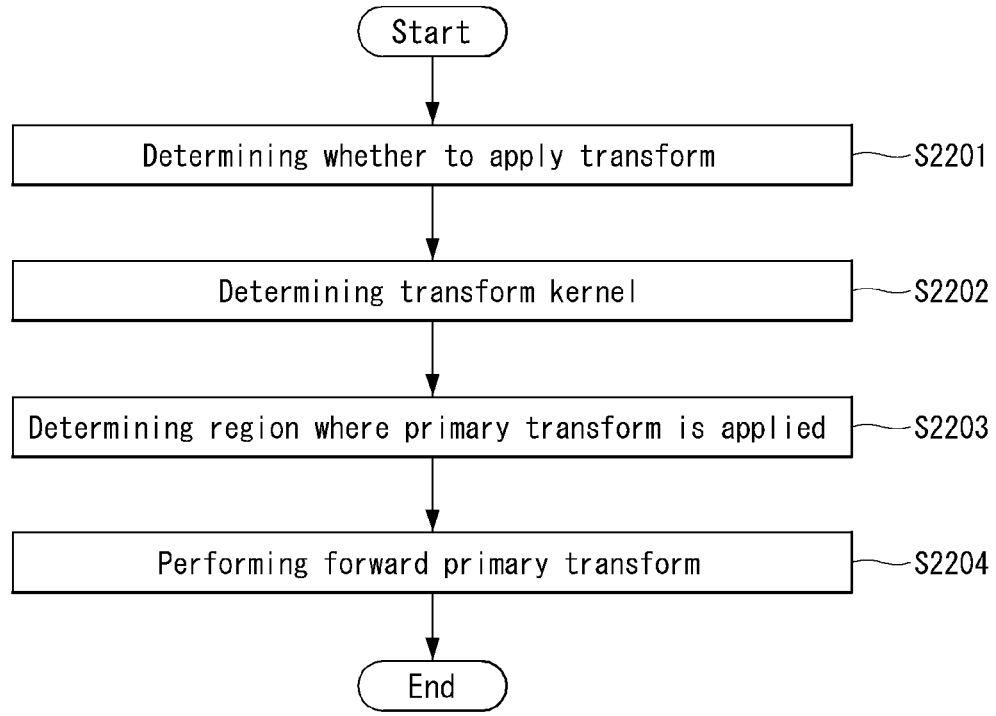

[FIG. 23]
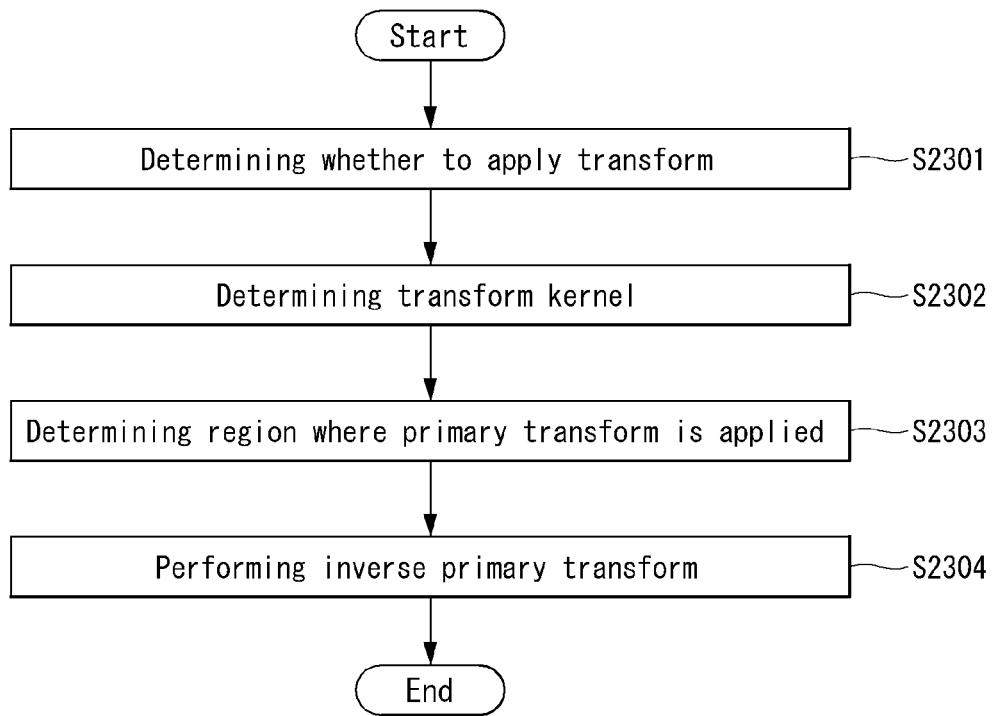
[FIG. 24]
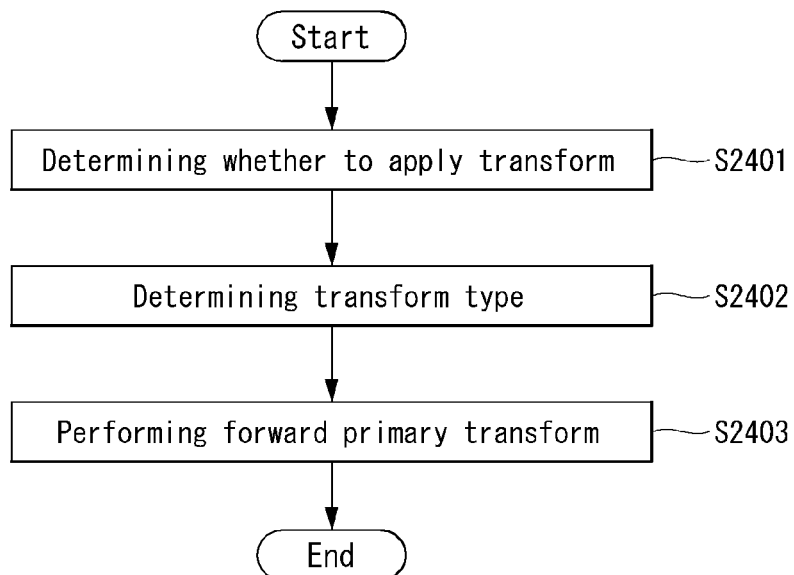

[FIG. 25]
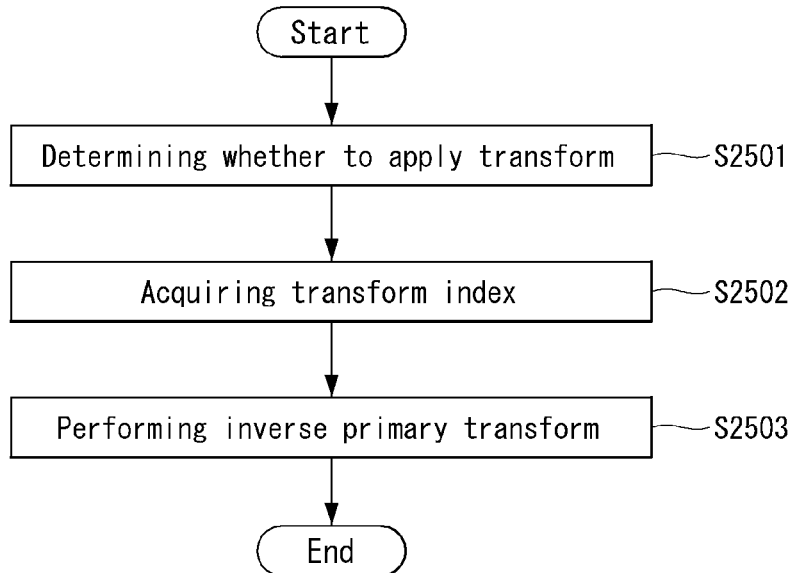
[FIG. 26]
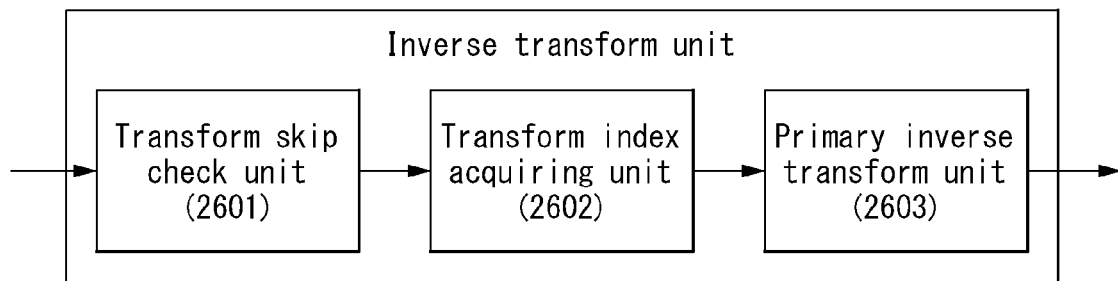
[FIG. 27]
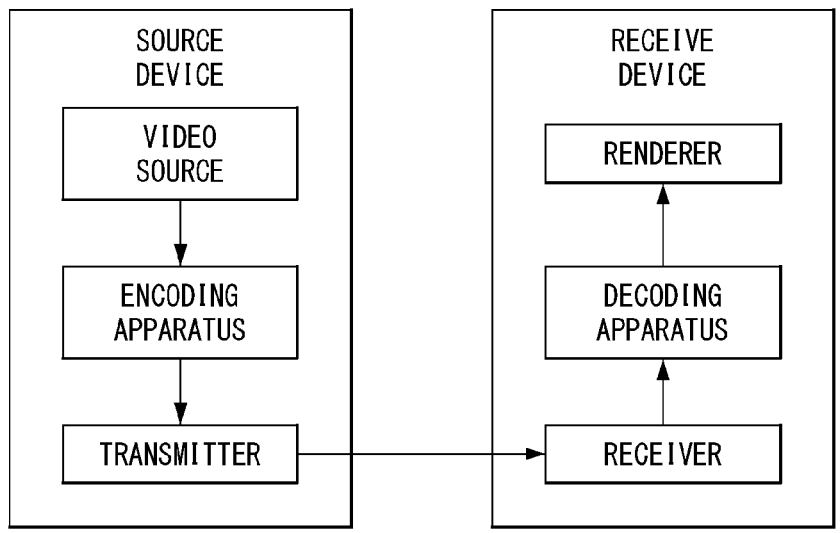

[FIG. 28]
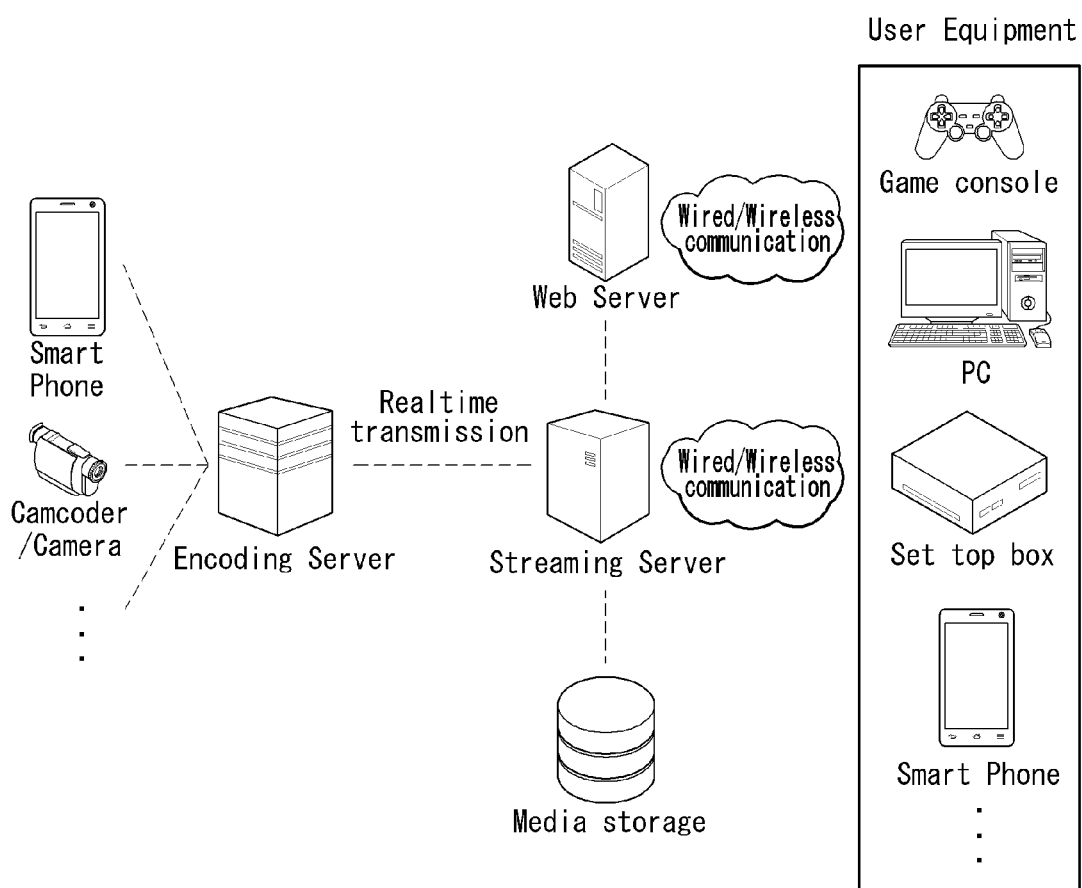

METHOD FOR PERFORMING TRANSFORM INDEX CODING ON BASIS OF INTRA PREDICTION MODE, AND DEVICE THEREFOR

CROSS-REFERENCE TO RELATED APPLICATIONS

This application is a Continuation Application of U.S. patent application Ser. No. 18/133,799, filed Apr. 12, 2023, which is a Continuation of U.S. patent application Ser. No. 17/729,597, filed Apr. 26, 2022, which is a Continuation Application of U.S. patent application Ser. No. 15/734,806, filed Dec. 3, 2020, the National Stage filing under 35 U.S.C. 371 of International Application No. PCT/KR2019/006895, filed on Jun. 7, 2019, which claims the benefit of U.S. Provisional Application No. 62/681,631, filed on Jun. 6, 2018, the contents of which are all hereby incorporated by reference herein in their entirety.

TECHNICAL FIELD

The present disclosure relates to a method and device of processing video signals, and more specifically, to a design of a transform index dependent on an intra prediction mode and a method of performing core transform using this.

BACKGROUND ART

Next-generation video contents will have features such as high spatial resolution, high frame rate, and high dimensionality of scene representation. In order to process the contents, a tremendous increase will be caused in terms of memory storage, memory access rate, and processing power.

Therefore, there is a need to design a new coding tool for processing the next-generation video contents more efficiently. In particular, when transform is applied, there is a need to design more efficient transform in terms of coding efficiency and complexity.

DETAILED DESCRIPTION OF INVENTION

Technical Problem

An object of the present disclosure is to propose an adaptive transform mapping method dependent on an intra prediction mode.

In addition, an object of the present disclosure is to propose an efficient encoding method of a transform index dependent on an intra prediction mode.

Technical objects to be achieved by the present disclosure are not limited to the aforementioned technical objects, and other technical objects not described above may be evidently understood by a person having ordinary skill in the art to which the present disclosure pertains from the following description.

Technical Solution

One aspect of the present disclosure, in a method of decoding a video signal, includes checking whether a transform skip is applied to a current block; acquiring a transform index indicating transform types applied to a horizontal direction and a vertical direction of the current block from among a plurality of predefined transform types from the video signal when the transform skip is not applied to the current block; and performing an inverse primary transform on the current block using the transform types indicated by the transform index, wherein the transform types applied to the horizontal direction and the vertical direction of the current block may be determined from among transform types defined according to an intra prediction mode of the current block based on the transform index.

Preferably, the method may further include grouping intra prediction modes into a plurality of groups based on a prediction direction; and mapping the transform types applied to the horizontal direction and the vertical direction to the transform index for each of the plurality of groups.

Preferably, the transform types applied to the horizontal direction and the vertical direction of the current block may be determined as the transform types indicated by the transform index from among transform types defined in a group to which the intra prediction mode of the current block belongs.

Preferably, the mapping the transform types to the transform index may be performed by mapping the transform types applied to the horizontal direction and the vertical direction to the transform index based on available values of the transform index for each of the plurality of groups.

Preferably, the transform index may be binarized using a truncated unary method.

Preferably, the performing the inverse primary transform may further include determining a region where a primary transform has been applied to the current block based on the transform types indicated by the transform index and a size of the current block; and performing the inverse primary transform on the region where the primary transform has been applied using the transform types indicated by the transform index.

Another aspect of the present disclosure, in a device of decoding a video signal, includes a transform skip check unit configured to check whether a transform skip is applied to a current block; a transform index acquiring unit configured to acquire a transform index indicating transform types applied to a horizontal direction and a vertical direction of the current block from among a plurality of predefined transform types from the video signal when the transform skip is not applied to the current block; and a primary inverse transform unit configured to perform an inverse primary transform on the current block using the transform types indicated by the transform index, wherein the transform types applied to the horizontal direction and the vertical direction of the current block may be determined from among transform types defined according to an intra prediction mode of the current block based on the transform index.

Preferably, the transform index acquiring unit may be configured to group intra prediction modes into a plurality of groups based on a prediction direction, and map the transform types applied to the horizontal direction and the vertical direction to the transform index for each of the plurality of groups.

Preferably, the transform types applied to the horizontal direction and the vertical direction of the current block may be determined as the transform types indicated by the transform index from among transform types defined in a group to which the intra prediction mode of the current block belongs.

Preferably, the transform index acquiring unit may be configured to map the transform types applied to the horizontal direction and the vertical direction to the transform index based on available values of the transform index for each of the plurality of groups.

Preferably, the transform index may be binarized using a truncated unary method.

Preferably, the primary inverse transform unit may be configured to determine a region where a primary transform has been applied to the current block based on the transform types indicated by the transform index and a size of the current block, and perform the inverse primary transform on the region where the primary transform has been applied using the transform types indicated by the transform index.

Advantageous Effects

According to an embodiment of the present disclosure, it is possible to reduce signaling bits and increase encoding performance by mapping transform types that can be used for a primary transform according to an intra prediction mode.

Effects which may be obtained by the present disclosure are not limited to the aforementioned effects, and other technical effects not described above may be evidently understood by a person having ordinary skill in the art to which the present disclosure pertains from the following description.

DESCRIPTION OF DRAWINGS

FIG. 1 is a schematic block diagram of an encoder in which encoding of a video signal is performed as an embodiment to which the present invention is applied.

FIG. 2 is a schematic block diagram of a decoder in which decoding of a video signal is performed as an embodiment to which the present invention is applied.

FIG. 3 illustrates embodiments to which the present invention may be applied, FIG. 3A is a diagram for describing block division structures by QuadTree (QT) (hereinafter, referred to as 'QT'), FIG. 3B is a diagram for describing block division structures by Binary Tree (BT) (referred to as 'TT'), FIG. 3C is a diagram for describing block division structures by Ternary Tree (TT) (hereinafter, referred to as 'TT'), and FIG. 3D is a diagram for describing block division structures by Asymmetric Tree (AT) (hereinafter, referred to as 'AT').

FIG. 4 is a schematic block diagram of transform and quantization units 120 and 130 and dequantization and inverse transform units 140 and 150 in an encoder as an embodiment to which the present invention is applied.

FIG. 5 is a schematic block diagram of a dequantization unit and an inverse transform unit 220 and 230 in a decoder as an embodiment to which the present invention is applied.

FIG. 6 is a table showing a transform configuration group to which Multiple Transform Selection (MTS) is applied as an embodiment to which the present invention is applied.

FIG. 7 is a flowchart showing an encoding process in which Multiple Transform Selection (MTS) is performed as an embodiment to which the present invention is applied.

FIG. 8 is a flowchart showing a decoding process in which Multiple Transform Selection (MTS) is performed as an embodiment to which the present invention is applied.

FIG. 9 is a flowchart for describing a process of encoding an MTS flag and an MTS index as an embodiment to which the present invention is applied.

FIG. 10 is a flowchart for describing a decoding process in which horizontal transform or vertical transform is applied to a row or a column based on an MTS flag and an MTX index as an embodiment to which the present invention is applied.

FIG. 11 is a flowchart of performing inverse transform based on a transform related parameter as an embodiment to which the present invention is applied.

FIG. 12 is a table showing allocation of a transform set for each intra prediction mode in an NSST as an embodiment to which the present invention is applied.

FIG. 13 is a calculation flow diagram for givens rotation as an embodiment to which the present invention is applied.

FIG. 14 illustrates one round configuration in 4×4 NSST constituted by a givens rotation layer and permutations as an embodiment to which the present invention is applied.

FIG. 15 is a block diagram for describing operations of forward reduced transform and inverse reduced transform as an embodiment to which the present invention is applied.

FIG. 16 is a diagram illustrating a process of performing backward scan from 64th to 17th according to a backward scan order as an embodiment to which the present invention is applied.

FIG. 17 illustrates three forward scan orders for a transform coefficient block (transform block) as an embodiment to which the present invention is applied.

FIG. 18 illustrates positions of valid transform coefficients and a forward scan order for each of 4×4 blocks when diagonal scan is applied and 4×4 RST is applied in top-left 4×8 blocks as an embodiment to which the present invention is applied.

FIG. 19 illustrates a case where valid transform coefficients of two 4×4 blocks are combined into one 4×4 block when diagonal scan is applied and 4×4 RST is applied in top-left 4×8 blocks as an embodiment to which the present invention is applied.

FIG. 20 is a flowchart of encoding a video signal based on reduced secondary transform as an embodiment to which the present invention is applied.

FIG. 21 is a flowchart of decoding a video signal based on reduced secondary transform as an embodiment to which the present invention is applied.

FIG. 22 is a diagram illustrating a method for encoding a video signal by using reduced transform as an embodiment to which the present invention is applied.

FIG. 23 is a diagram illustrating a method for decoding a video signal by using reduced transform as an embodiment to which the present invention is applied.

FIG. 24 is a diagram illustrating a method of encoding a video signal by performing Multiple Transform Selection (MTS) based on an intra prediction mode as an embodiment to which the present disclosure is applied.

FIG. 25 is a diagram illustrating a method of decoding a video signal by performing Multiple Transform Selection (MTS) based on an intra prediction mode as an embodiment to which the present disclosure is applied.

FIG. 26 is a diagram illustrating an inverse transform unit according to an embodiment to which the present disclosure is applied.

FIG. 27 shows a video coding system to which the present disclosure is applied.

FIG. 28 shows a structure diagram of a content streaming system as an embodiment to which the present disclosure is applied.

MODE FOR INVENTION

[ ] [ ] [ ] [ ] [ ] [ ] [ ] [ ] [ ] [ ] [ ] [ ] Hereinafter, a configuration and an operation of an embodiment of the present invention will be described with reference to the accompanying drawings, the configuration and operation of the present invention described by the drawings will be described as one embodiment, whereby the technical spirit of the present invention and a core composition and an operation thereof are not limited.

In addition, the term used in the present invention is selected as a general term widely used as possible now, in a specific case will be described using terms arbitrarily selected by the applicant. In such a case, since the meaning is clearly stated in the detailed description of the part, it should not be interpreted simply by the name of the term used in the description of the present invention, and it should be understood that the meaning of the term should be interpreted.

In addition, terms used in the present invention may be replaced for more appropriate interpretation when there are general terms selected to describe the invention or other terms having similar meanings. For example, signals, data, samples, pictures, frames, blocks, etc., may be appropriately replaced and interpreted in each coding process. In addition, partitioning, decomposition, splitting, and division may be appropriately replaced and interpreted in each coding process.

In this document, Multiple Transform Selection (MTS) may refer to a method for performing transform using at least two transform types. This may also be expressed as an Adaptive Multiple Transform (AMT) or Explicit Multiple Transform (EMT), and likewise, mts_idx may also be expressed as AMT_idx, EMT_idx, tu_mts_idx, AMT_TU_idx, EMT_TU_idx, transform index, or transform combination index and the present invention is not limited to the expressions.

FIG. 1 is a schematic block diagram of an encoder in which encoding of a video signal is performed as an embodiment to which the present invention is applied.

Referring to FIG. 1, the encoder 100 may be configured to include an image division unit 110, a transform unit 120, a quantization unit 130, a dequantization unit 140, an inverse transform unit 150, a filtering unit 160, a decoded picture buffer (DPB) 170, an inter-prediction unit 180, an intra-prediction unit 185, and an entropy encoding unit 190.

The image division unit 110 may divide an input image (or picture or frame) input into the encoder 100 into one or more processing units. For example, the processing unit may be a Coding Tree Unit (CTU), a Coding Unit (CU), a Prediction Unit (PU), or a Transform Unit (TU).

However, the terms are only used for the convenience of description of the present invention and the present invention is not limited to the definition of the terms. In addition, in this specification, for the convenience of the description, the term coding unit is used as a unit used in encoding or decoding a video signal, but the present invention is not limited thereto and may be appropriately interpreted according to the present invention.

The encoder 100 subtracts a prediction signal (or a prediction block) output from the inter-prediction unit 180 or the intra-prediction unit 185 from the input image signal to generate a residual signal (or a residual block) and the generated residual signal is transmitted to the transform unit 120.

The transform unit 120 may generate a transform coefficient by applying a transform technique to the residual signal. A transform process may be applied to a quadtree structure square block and a block (square or rectangle) divided by a binary tree structure, a ternary tree structure, or an asymmetric tree structure.

The transform unit 120 may perform a transform based on a plurality of transforms (or transform combinations), and the transform scheme may be referred to as multiple transform selection (MTS). The MTS may also be referred to as an Adaptive Multiple Transform (AMT) or an Enhanced Multiple Transform (EMT).

The MTS (or AMT or EMT) may refer to a transform scheme performed based on a transform (or transform combinations) adaptively selected from the plurality of transforms (or transform combinations).

The plurality of transforms (or transform combinations) may include the transforms (or transform combinations) described in FIG. 6 of this specification. In this specification, the transform or transform type may be expressed as, for example, DCT-Type 2, DCT-II, DCT2, or DCT-2.

The transform unit 120 may perform the following embodiments.

The present invention provides a method for designing an RST that may be applied to a 4×4 block.

The present invention provides a configuration of a region to which the 4×4 RST is to be applied, a method for arranging transform coefficients generated after applying the 4×4 RST, a scan order of the arranged transform coefficients, a method for sorting and combining transform coefficients generated for each block, and the like.

The present invention provides a method for coding a transform index that specifies the 4×4 RST.

The present invention provides a method for conditionally coding a corresponding transform index by checking whether a non-zero transform coefficient exists in an unacceptable region when applying the 4×4 RST.

The present invention provides a method for conditionally coding the corresponding transform index after coding a last non-zero transform coefficient position, and then omitting relevant residual coding for positions that are not accepted.

The present invention provides a method for applying different transform index coding and residual coding to a luma block and a chroma block when applying the 4×4 RST.

Detailed embodiments thereof will be described in more detail in this specification.

The quantization unit 130 may quantize the transform coefficient and transmits the quantized transform coefficient to the entropy encoding unit 190 and the entropy encoding unit 190 may entropy-code a quantized signal and output the entropy-coded quantized signal as a bitstream.

Although the converter 120 and the quantization unit 130 are described as separate functional units, the present invention is not limited thereto and may be combined into one functional unit. The dequantization unit 140 and the inverse transform unit 150 may also be similarly combined into one functional unit.

A quantized signal output from the quantization unit 130 may be used for generating the prediction signal. For example, inverse quantization and inverse transform are applied to the quantized signal through the dequantization unit 140 and the inverse transform unit 1850 in a loop to reconstruct the residual signal. The reconstructed residual signal is added to the prediction signal output from the inter-prediction unit 180 or the intra-prediction unit 185 to generate a reconstructed signal.

Meanwhile, deterioration in which a block boundary is shown may occur due to a quantization error which occurs during such a compression process. Such a phenomenon is referred to as blocking artifacts and this is one of key elements for evaluating an image quality. A filtering process may be performed in order to reduce the deterioration. Blocking deterioration is removed and an error for a current picture is reduced through the filtering process to enhance an image quality.

The filtering unit 160 applies filtering to the reconstructed signal and outputs the applied reconstructed signal to a reproduction device or transmits the output reconstructed signal to the decoded picture buffer 170. The inter-prediction unit 170 may use the filtered signal transmitted to the decoded picture buffer 180 as the reference picture. As such, the filtered picture is used as the reference picture in the inter-picture prediction mode to enhance the image quality and the encoding efficiency.

The decoded picture buffer 170 may store the filtered picture in order to use the filtered picture as the reference picture in the inter-prediction unit 180.

The inter-prediction unit 180 performs a temporal prediction and/or spatial prediction in order to remove temporal redundancy and/or spatial redundancy by referring to the reconstructed picture. Here, since the reference picture used for prediction is a transformed signal that is quantized and inverse-quantized in units of the block at the time of encoding/decoding in the previous time, blocking artifacts or ringing artifacts may exist.

Accordingly, the inter-prediction unit 180 may interpolate a signal between pixels in units of a sub-pixel by applying a low-pass filter in order to solve performance degradation due to discontinuity or quantization of such a signal. Here, the sub-pixel means a virtual pixel generated by applying an interpolation filter and an integer pixel means an actual pixel which exists in the reconstructed picture. As an interpolation method, linear interpolation, bi-linear interpolation, wiener filter, and the like may be adopted.

An interpolation filter is applied to the reconstructed picture to enhance precision of prediction. For example, the inter-prediction unit 180 applies the interpolation filter to the integer pixel to generate an interpolated pixel and the prediction may be performed by using an interpolated block constituted by the interpolated pixels as the prediction block.

Meanwhile, the intra-prediction unit 185 may predict the current block by referring to samples in the vicinity of a block which is to be subjected to current encoding. The intra-prediction unit 185 may perform the following process in order to perform the intra prediction. First, a reference sample may be prepared, which is required for generating the prediction signal. In addition, the prediction signal may be generated by using the prepared reference sample. Thereafter, the prediction mode is encoded. In this case, the reference sample may be prepared through reference sample padding and/or reference sample filtering. Since the reference sample is subjected to prediction and reconstruction processes, a quantization error may exist. Accordingly, a reference sample filtering process may be performed with respect to each prediction mode used for the intra prediction in order to reduce such an error.

The prediction signal generated through the inter-prediction unit 180 or the intra-prediction unit 185 may be used for generating the reconstructed signal or used for generating the residual signal.

FIG. 2 is a schematic block diagram of a decoder in which decoding of a video signal is performed as an embodiment to which the present invention is applied.

Referring to FIG. 2, the decoder 200 may be configured to include a parsing unit (not illustrated), an entropy decoding unit 210, a dequantization unit 220, an inverse transform unit 230, a filtering unit 240, a decoded picture buffer (DPB) unit 250, an inter-prediction unit 260, and an intra-prediction unit 265.

In addition, a reconstructed video signal output through the decoder may be reproduced through a reproduction device.

The decoder 200 may receive the signal output from the encoder 100 of FIG. 1 and the received signal may be entropy-decoded through the entropy decoding unit 210.

The dequantization unit 220 acquires the transform coefficient from an entropy-decoded signal by using quantization step size information.

The inverse transform unit 230 inversely transforms the transform coefficient to acquire the residual signal.

Here, the present invention provides a method for configuring a transform combination for each transform configuration group divided by at least one of a prediction mode, a block size or a block shape and the inverse transform unit 230 may perform inverse transform based on the transform combination configured by the present invention. Further, the embodiments described in this specification may be applied.

The inverse transform unit 230 may perform the following embodiments.

The present invention provides a method for reconstructing the video signal based on reduced secondary transform.

The inverse transform unit 230 may derive a secondary transform corresponding to a secondary transform index, performs inverse secondary transform for the transform coefficient block by using the secondary transform, and perform inverse primary transform for the block in which the inverse secondary transform is performed. Here, the secondary transform refers to the reduced secondary transform and the reduced secondary transform represents a transform in which N residual data (N×1 residual vectors) are input to output L (L<N) transform coefficient data (L×1 transform coefficient vectors).

The present invention is characterized in that the reduced secondary transform is applied to a specific region of the current block and the specific region is a top-left M×M (M≤N) in the current block.

The present invention is characterized in that 4×4 reduced secondary transform is applied to each of 4×4 blocks divided in the current blocks when the inverse secondary transform is performed.

The present invention is characterized in that it is determined whether the secondary transform index is obtained based on the position of the last non-zero transform coefficient in the transform coefficient block.

The present invention is characterized in that when the last non-zero transform coefficient is not positioned in the specific region, the secondary transform index is obtained and the specific region indicates remaining regions other than a position when the non-zero transform coefficient may exist when the transform coefficients are arranged according to the scan order in the case where the reduced secondary transform is applied.

The inverse transform unit 230 may derive a transform combination corresponding to a primary transform index and perform an inverse primary transform by using the transform combination. Here, the primary transform index corresponds to any one of a plurality of transform combinations constituted by a combination of DST7 and/or DCT8 and the transform combination includes a horizontal transform and a vertical transform. In this case, the horizontal transformation and the vertical transformation correspond to either the DST7 or the DCT8.

Although the dequantization unit 220 and the inverse transform unit 230 are described as separate functional units, the present invention is not limited thereto and may be combined into one functional unit.

The obtained residual signal is added to the prediction signal output from the inter-prediction unit 260 or the intra-prediction unit 265 to generate the reconstructed signal.

The filtering unit 240 applies filtering to the reconstructed signal and outputs the applied reconstructed signal to a generation device or transmits the output reconstructed signal to the decoded picture buffer unit 250. The inter-prediction unit 250 may use the filtered signal transmitted to the decoded picture buffer unit 260 as the reference picture.

In this specification, the embodiments described in the transform unit 120 and the respective functional units of the encoder 100 may be equally applied to the inverse transform unit 230 and the corresponding functional units of the decoder, respectively.

FIG. 3 illustrates embodiments to which the present invention may be applied, FIG. 3A is a diagram for describing block division structures by QuadTree (QT) (hereinafter, referred to as 'QT'), FIG. 3B is a diagram for describing block division structures by Binary Tree (BT) (referred to as 'TT'), FIG. 3C is a diagram for describing block division structures by Ternary Tree (TT) (hereinafter, referred to as 'TT'), and FIG. 3D is a diagram for describing block division structures by Asymmetric Tree (AT) (hereinafter, referred to as 'AT').

In video coding, one block may be divided based on a QuadTree (QT). In addition, one sub block divided by the QT may be further divided recursively using the QT. A leaf block which is not QT-divided any longer may be divided by at least one scheme of Binary Tree (BT), Ternary Tree (TT), and Asymmetric Tree (AT). The BT may have two types of divisions: horizontal BT (2N×N, 2N×N) and vertical BT (N×2N, N×2N). The TT may have two types of divisions: horizontal TT (2N×½N, 2N×N, 2N×½N) and vertical TT (½N×2N, N×2N, ½N×2N). The AT may have four types of divisions: horizontal-up AT (2N×½N, 2N×3/2N), horizontal-down AT (2N×3/2N, 2N×½N), vertical-left AT (½N×2N, 3/2N×2N), vertical-right AT (3/2N×2N, ½N×2N). Each of the BT, the TT, and the AT may be further divided recursively by using the BT, the TT, and the AT.

FIG. 3A illustrates an example of QT division. Block A may be divided into four sub blocks A0, A1, A2, and A3 by the QT. Sub block A1 may be divided into four sub blocks B0, B1, B2, and B3 by the QT again.

FIG. 3B illustrates an example of BT division. Block B3 which is not divided by the QT any longer may be divided into vertical BT (C0, C1) or horizontal BT (D0, D1). Like block C0, each sub block may be further recursively divided like a form of horizontal BT (E0, E1) or vertical BT (F0, F1).

FIG. 3C illustrates an example of TT division. Block B3 which is not divided by the QT any longer may be divided into vertical TT (C0, C1, C2) or horizontal TT (D0, D1, D2). Like block C1, each sub block may be further recursively divided like a form of horizontal TT (E0, E1, E2) or vertical TT (F0, F1, F2).

FIG. 3D illustrates an example of AT division. Block B3 which is not divided by the QT any longer may be divided into vertical AT (C0, C1) or horizontal AT (D0, D1). Like block C1, each sub block may be further recursively divided like a form of horizontal AT (E0, E1) or vertical TT (F0, F1).

Meanwhile, the BT, TT, and AT divisions may be used together and made. For example, the sub block divided by the BT may be divided by the TT or AT. Further, the sub block divided by the TT may be divided by the BT or AT. Further, the sub block divided by the AT may be divided by the BT or TT. For example, after the horizontal BT division, each sub block may be divided into vertical BTs or after the vertical BT division, each sub block may be divided into horizontal BTs. The two types of division methods are different from each other in terms of a division order, but are the same as each other in terms of a final division shape.

Further, when the block is divided, an order of searching for the block may be variously defined. In general, searching may be performed from left to right and from top to bottom, and the searching for the block may mean an order of deciding whether to further divide each divided sub-block, mean a coding order of each sub block when each sub block is no longer divided, or mean a search order when referring to information of another neighboring block in the sub block.

FIGS. 4 and 5 illustrate embodiments to which the present invention is applied, FIG. 4 is a schematic block diagram of transform and quantization units 120 and 130 and dequantization and inverse transform units 140 and 150 in an encoder, and FIG. 5 is a schematic block diagram of dequantization and inverse transform units 220 and 230 in a decoder.

Referring to FIG. 4, the transform and quantization units 120 and 130 may include a primary transform unit 121, a secondary transform unit 122, and a quantization unit 130. The dequantization and inverse transform units 140 and 150 may include a dequantization unit 140, an inverse secondary transform unit 151, and an inverse primary transform unit 152.

Referring to FIG. 5, the dequantization and inverse transform units 220 and 230 may include a dequantization unit 220, an inverse secondary transform unit 231, and an inverse primary transform unit 232.

In the present invention when the transform is performed, the transform may be performed through a plurality of steps. For example, two steps of the primary transform and the secondary transform may be applied as illustrated in FIG. 4 or more transform steps may be used according to an algorithm. Here, the primary transform may also be referred to as a core transform.

The primary transform unit 121 may apply the primary transform to the residual signal and here, the primary transform may be defined in a table in the encoder and/or the decoder.

The primary transform may adopt Discrete Cosine Transform type 2 (hereinafter, referred to as 'DCT2').

Alternatively, only in a specific case, Discrete Sine Transform-type 7 (hereinafter, referred to as 'DST7') may be adopted. For example, the DST7 may be applied to the 4×4 block in the intra-prediction mode.

Further, the primary transform may adopt combinations of various transforms DST 7, DCT 8, DST 1, and DCT 5 of the multiple transform selection (MTS). For example, FIG. 6 may be adopted.

The secondary transform unit 122 may apply the secondary transform to a primary transformed signal and here, the secondary transform may be defined in the table in the encoder and/or the decoder.

As an embodiment, the secondary transform may conditionally adopt a non-separable secondary transform (hereinafter, referred to as 'NSST'). For example, the NSST may be applied only to the intra-prediction block and may have a transform set applicable to each prediction mode group.

Here, the prediction mode group may be configured based on symmetry with respect to a prediction direction. For example, since prediction mode 52 and prediction mode 16 are symmetrical based on prediction mode 34 (diagonal direction), the same transform set may be applied by forming one group. In this case, when the transform for prediction mode 52 is applied, input data is transposed and then applied because prediction mode 52 has the same transform set as prediction mode 16.

Meanwhile, since the symmetry for the direction does not exist in the case of a planar mode and a DC mode, each mode has a different transform set and the corresponding transform set may be constituted by two transforms. In respect to the remaining direction modes, each transform set may be constituted by three transforms.

As another embodiment, the secondary transform may adopt combinations of various transforms DST 7, DCT 8, DST 1, and DCT 5 of the multiple transform selection (MTS). For example, FIG. 6 may be adopted.

As another embodiment, the DST 7 may be applied to the secondary transform.

As another embodiment, the secondary transform may not be applied to the entire primary transformed block but may be applied only to a top-left specific region. For example, when the block size is 8×8 or more, 8×8 NSST is applied and when the block size is less than 8×8, a 4×4 secondary transform may be applied. In this case, the block may be divided into 4×4 blocks and then the 4×4 secondary transform may be applied to each divided block.

As another embodiment, even in the case of 4×N/N×4 (N>=16), the 4×4 secondary transform may be applied.

The secondary transform (e.g., NSST), the 4×4 secondary transform, and an 8×8 secondary transform will be described in more detail with reference to FIGS. 12 to 15 and other embodiments in the specification.

The quantization unit 130 may perform quantization for the secondary transformed signal.

The dequantization and inverse transform units 140 and 150 perform the above-described process in reverse, and a redundant description thereof will be omitted.

FIG. 5 is a schematic block diagram of a dequantization unit 220 and an inverse transform unit 230 in a decoder.

Referring to FIG. 5, the dequantization and inverse transform units 220 and 230 may include a dequantization unit 220, an inverse secondary transform unit 231, and an inverse primary transform unit 232.

The dequantization unit 220 acquires the transform coefficient from an entropy-decoded signal by using quantization step size information.

The inverse secondary transform unit 231 performs an inverse secondary transform for the transform coefficients. Here, the inverse secondary transform represents an inverse transform of the secondary transform described in FIG. 4.

As another embodiment, the secondary transform may adopt combinations of various transforms DST 7, DCT 8, DST 1, and DCT 5 of the multiple transform selection (MTS). For example, FIG. 6 may be adopted.

The inverse primary transform unit 232 performs an inverse primary transform for the inverse secondary transformed signal (or block) and obtains the residual signal. Here, the inverse primary transform represents the inverse transform of the primary transform described in FIG. 4.

As an embodiment, the primary transform may adopt combinations of various transforms DST 7, DCT 8, DST 1, and DCT 5 of the multiple transform selection (MTS). For example, FIG. 6 may be adopted.

As an embodiment of the present invention, the DST 7 may be applied to the primary transform.

As an embodiment of the present invention, the DST 8 may be applied to the primary transform.

The present invention provides a method for configuring a transform combination for each transform configuration group divided by at least one of a prediction mode, a block size or a block shape and the inverse primary transform unit 232 may perform the inverse transform based on the transform combination configured by the present invention. Further, the embodiments described in this specification may be applied.

FIG. 6 is a table showing a transform configuration group to which Multiple Transform Selection (MTS) is applied as an embodiment to which the present invention is applied.

Transform configuration group to which Multiple Transform Selection (MTS) is applied In this specification, a j-th transform combination candidate for transform configuration group Gi is represented by a pair shown in Equation 1 below.

$$(H(Gi, j), V(Gi, j)) \qquad \text{[Equation 1]}$$

Here, H(Gi, j) indicates the horizontal transform for the j-th candidate, and V(Gi, j) indicates the vertical transform for the j-th candidate. For example, in FIG. 6, H(G3, 2)=DST7, V(G3, 2)=DCT8 may be represented. Depending on a context, a value assigned to H(Gi, j) or V(Gi, j) may be a nominal value to distinguish transformations, as in the example above or may be an index value indicating the transform or may be a 2 dimensional (D) matrix for the transform.

Further, in this specification, a 2D matrix value for DCT and DST may be represented as shown in Equation 2 and 3 below.

$$DCT \text{ type 2: } C_N^{II}, \qquad \text{[Equation 2]}$$
$$DCT \text{ type 8: } C_N^{VIII}$$

$$DST \text{ type 7: } S_N^{VII}, \qquad \text{[Equation 3]}$$
$$DST \text{ type 4: } S_N^{IV}$$

Here, whether the DST or the DCT is represented by S or C and a type number is expressed in superscripts in the form of Roman numerals and N in a subscript indicates an N×N transform. Further, 2D matrices such as the $C_N^{II}$ and the $S_N^{IV}$ suppose that column vectors form a transform basis.

Referring to FIG. 6, the transform configuration groups may be determined based on the prediction mode and the number of groups may be a total of six groups G0 to G5. In addition, G0 to G4 correspond to a case where intra prediction is applied, and G5 represents transform combinations (or transform sets and transform combination sets) applied to the residual block generated by the inter prediction.

One transform combination may be constituted by a horizontal transform (or row transform) applied to rows of a corresponding 2D block and a vertical transform (or column transform) applied to columns.

Here, each of all of the transform configuration groups may have four transform combination candidates. The four transform combinations may be selected or determined through transform combination indexes of 0 to 3 and transmitted by encoding the transform combination index from the encoder to the decoder.

As an embodiment, the residual data (or residual signal) obtained through the intra prediction may have different statistical characteristics according to the intra prediction mode. Therefore, as illustrated in FIG. 6, transforms other than a general cosine transform may be applied to each intra prediction mode.

Referring to FIG. 6, a case of using 35 intra prediction modes and a case of using 67 intra prediction modes are illustrated. A plurality of transform combinations may be applied to each transform configuration group divided in each intra prediction mode column. For example, the plurality of transform combinations may be constituted by four (row direction transforms and column direction transforms) combinations. As a specific example, DST-7 and DST-5 may be applied in a row (horizontal) direction and a column (vertical) direction in group 0, and as a result, a total of four combinations are available.

Since a total of transform kernel combinations may be applied to each intra prediction mode, a transform combination index for selecting one of the transform kernel combinations may be transmitted every transform unit. In this specification, the transform combination index may be called MTX index and expressed as mtx_idx.

Further, in addition to the transform kernels presented in FIG. 6 above, a case where DCT2 is optimal for both the row direction and the column direction due to characteristics of the residual signal may occur. Accordingly, the MTS flag is defined for each coding unit to adaptively perform the transform. Here, when the MTS flag is 0, DCT2 may be applied to both the row direction and the column direction and when the MTS flag is 1, one of four combinations may be selected or determined through the MTS index.

As an embodiment, when the MTS flag is 1, if the number of non-zero transform coefficients for one transform unit is not greater than a threshold, the DST-7 may be applied both the row direction and the column direction is not applied without applying the transform kernels of FIG. 6. For example, the threshold may be set to 2, which may be set differently based on the block size or the size of the transform unit. This is also applicable to other embodiments in the specification.

As an embodiment, if the number of non-zero transform coefficients is not greater than the threshold, by first parsing the transform coefficient values, the amount of additional information transmission may be reduced by applying the DST-7 without parsing the MTS index.

As an embodiment, when the MTS flag is 1, if the number of non-zero transform coefficients is greater than the threshold for one transform unit, the MTS index may be parsed and the horizontal transform and the vertical transform may be determined based on the MTS index.

As an embodiment, the MTS may be applied only when both a width and a height of the transform unit is equal to or smaller than 32.

As an embodiment, FIG. 6 may be preconfigured through off-line training.

As an embodiment, the MTX index may be defined as one index which may simultaneously indicate the horizontal transform and the vertical transform. Alternatively, the MTX index may be separately defined as a horizontal transform index and a vertical transform index.

As an embodiment, the MTS flag or the MTX index may be defined at at least one level of a sequence, a picture, a slice, a block, a coding unit, a transform unit, or a prediction unit. For example, the MTS flag or the MTX index may be defined at at least one level of a sequence parameter set (SPS), the coding unit, or the transform unit. Further, as an example, a syntax flag for enabling/disabling the MTX may be defined at at least one level of the sequence parameter set (SPS), a picture parameter set (PPS), or a slice header.

As another embodiment, the transform combination (horizontal transform or vertical transform) corresponding to the transform index may be configured without dependence on the MTS flag, the prediction mode, and/or a block shape. For example, the transform combination may be configured by at least one of DCT2, DST7, and/or DCT8. As a specific example, when the transform index is 0, 1, 2, 3, or 4, each transform combination may be (DCT2, DCT2), (DST7, DST7), (DCT8, DST7), (DST7, DCT8), or (DCT8, DCT8).

FIG. 7 is a flowchart showing an encoding process in which Multiple Transform Selection (MTS) is performed as an embodiment to which the present invention is applied.

In this specification, an embodiment in which transforms are a separately applied to the horizontal direction and the vertical direction is basically described, but the transform combination may be configured as non-separable transforms.

Alternatively, the transform combination may be configured by a mixture of separable transforms and non-separable transforms. In this case, when the non-separable transform is used, row/column transform selection or horizontal/vertical direction selection may not be required and only when the separable transform is selected, the transform combinations of FIG. 6 may be used.

Further, schemes proposed by this specification may be applied regardless of the primary transform or the secondary transform. That is, there is no limit that the schemes should be applied only to any one of both the primary transform and the secondary transform and the schemes may be applied to both the primary transform and the secondary transform. Here, the primary transform may mean a transform for transforming the residual block first and the secondary transform may mean a transform for applying the transform to the block generated as a result of the primary transform.

First, the encoder may determine the transform configuration group corresponding to the current block. Here, the transform configuration group may mean the transform configuration group of FIG. 6 and the present invention is not limited thereto and the transform configuration group may be constituted by other transform combinations.

The encoder may perform a transform for candidate transform combinations usable in the transform configuration group (S720).

As a result of performing the transform, the encoder may determine or select a transform combination having a smallest rate distortion (RD) cost (S730).

The encoder may encode the transform combination index corresponding to the selected transform combination (S740).

FIG. 8 is a flowchart showing a decoding process in which Multiple Transform Selection (MTS) is performed as an embodiment to which the present invention is applied.

First, the decoder may determine the transform configuration group for the current block (S810).

The decoder may parse (or acquire) the transform combination index from the video signal and here, the transform combination index may correspond to any one of the plurality of transform combinations in the transform configuration group (S820). For example, the transform configuration group may include Discrete Sine Transform type (DST) 7 and Discrete Cosine Transform type (DST) 8. The transform combination index may be referred to as the MTS index.

As an embodiment, the transform configuration group may be configured based on at least one of the prediction mode, the block size, or the block shape of the current block.

The decoder may derive the transform combination corresponding to the transform combination index (S830). Here, the transform combination may be constituted by the horizontal transform and the vertical transform and may include at least one of the DST-7 or the DCT-8.

Further, the transform combination may mean the transform combination described in FIG. 6, but the present invention is not limited thereto. That is, the transform combination may be configured by other transform combinations depending on other embodiments in this specification.

The decoder may perform the inverse transform for the current block based on the transform combination (S840). When the transform combination is constituted by the row (horizontal) transform and the column (vertical) transform, the column (vertical) transform may be applied after applying the row (horizontal) transform first. However, the present invention is not limited thereto and the transform order may be reversed or when the transform combination is constituted by the non-separable transforms, the non-separable transform may be immediately applied.

As an embodiment, when the vertical transform or the horizontal transform is the DST-7 or the DCT-8, the inverse transform of the DST-7 or the inverse transform of the DCT-8 may be applied to each row and then applied to each row.

As an embodiment, in respect to the vertical transform or the horizontal transform, different transform may be applied to each row and/or each column.

As an embodiment, the transform combination index may be acquired based on the MST flag indicating whether the MTS is performed. That is, the transform combination index may be obtained when the MTS is performed according to the MTS flag.

As an embodiment, the decoder may check whether the number of non-zero transform coefficients is greater than the threshold. In this case, the transform may be obtained when the number of non-zero transform coefficients is greater than the threshold.

As an embodiment, the MTS flag or the MTX index may be defined at least one level of a sequence, a picture, a slice, a block, a coding unit, a transform unit, or a prediction unit.

As an embodiment, the inverse transform may be applied only when both the width and the height of the transform unit is equal to or smaller than 32.

On the other hand, as another embodiment, a process of determining the transform configuration group and a process of parsing the transform combination index may be performed at the same time. Alternatively, step S810 may be preconfigured and omitted in the encoder and/or the decoder.

FIG. 9 is a flowchart for describing a process of encoding an MTS flag and an MTS index as an embodiment to which the present invention is applied.

The encoder may determine whether the Multiple Transform Selection (MTS) is applied to the current block (S910).

When the Multiple Transform Selection (MTS) is applied, the encoder may encode MTS flag=1 (S920).

In addition, the encoder may determine the MTS index based on at least one of the prediction mode, the horizontal transform, and the vertical transform of the current block (S930). Here, the MTS index may mean an index indicating any one of the plurality of transform combinations for each intra prediction mode and the MTS index may be transmitted for each transform unit.

When the MTS index is determined, the encoder may encode the MTS index (S940).

On the other hand, when the Multiple Transform Selection (MTS) is not applied, the encoder may encode MTS flag=0 (S920).

FIG. 10 is a flowchart for describing a decoding process in which horizontal transform or vertical transform is applied to a row or a column based on an MTS flag and an MTX index as an embodiment to which the present invention is applied.

The decoder may parse the MTS flag from the bitstream (S1010). Here, the MTS flag may indicate whether the Multiple Transform Selection (MTS) is applied to the current block.

The decoder may determine whether the Multiple Transform Selection (MTS) is applied to the current block based on the MTS flag (S1020). For example, it may be checked whether the MTS flag is 1.

When the MTS flag is 1, the decoder may check whether the number of non-zero transform coefficients is greater than (or equal to or greater than) the threshold (S1030). For example, the threshold may be set to 2, which may be set differently based on the block size or the size of the transform unit.

When the number of non-zero transform coefficients is greater than the threshold, the decoder may parse the MTS index (S1040). Here, the MTS index may mean any one of the plurality of transform combinations for each intra prediction mode or inter prediction mode and the MTS index may be transmitted for each transform unit. Alternatively, the MTS index may mean an index indicating any one transform combination defined in a preconfigured transform combination table and here, the preconfigured transform combination table may mean FIG. 6, but the present invention is limited thereto.

The decoder may derive or determine the horizontal transform and the vertical transform based on at least one of the MTS index and the prediction mode (S1050).

Alternatively, the decoder may derive the transform combination corresponding to the MTX index. For example, the decoder may derive or determine the horizontal transform and the vertical transform corresponding to the MTS index.

When the number of non-zero transform coefficients is not greater than the threshold, the decoder may apply a preconfigured vertical inverse transform (S1060). For example, the vertical inverse transform may be the inverse transform of the DST7.

In addition, the decoder may apply a preconfigured horizontal inverse transformation for each row (S1070). For example, the horizontal inverse transform may be the inverse transform of the DST7. That is, when the number of non-zero transform coefficients is not greater than the threshold, a transform kernel preconfigured by the encoder or decoder may be used. For example, a transform kernel (e.g., DCT-2, DST-7, or DCT-8) that is not defined in the transform combination table illustrated in FIG. 6, but is widely used may be used.

Meanwhile, when the MTS flag is 0, the decoder may apply the preconfigured vertical inverse transform for each column (S1080). For example, the vertical inverse transform may be the inverse transform of the DCT2.

In addition, the decoder may apply the preconfigured horizontal inverse transformation for each row (S1090). For example, the horizontal inverse transform may be the inverse transform of the DCT2. That is, when the MTS flag is 0, the transform kernel preconfigured by the encoder or decoder may be used. For example, the transform kernel that is not defined in the transform combination table illustrated in FIG. 6, but is widely used may be used.

FIG. 11 is a flowchart of performing inverse transform based on a transform related parameter as an embodiment to which the present invention is applied.

The decoder to which the present invention n is applied may obtain sps_mts_intra_enabled_flag or sps_mts_inter_enabled_flag (S1110). Here, sps_mts_intra_enabled_flag indicates whether tu_mts_flag exists in a residual coding syntax of an intra coding unit. For example, when sps_mts_intra_enabled_flag=0, tu_mts_flag does not exist in the residual coding syntax of the intra coding unit and when sps_mts_intra_enabled_flag=0, tu_mts_flag exists in the residual coding syntax of the intra coding unit. In addition, sps_mts_inter_enabled_flag indicates whether tu_mts_flag exists in the residual coding syntax of the inter coding unit. For example, when sps_mts_inter_enabled_flag=0, tu_mts_flag does not exist in the residual coding syntax of the intra coding unit and when sps_mts_inter_enabled_flag=0, tu_mts_flag exists in the residual coding syntax of the inter coding unit.

The decoder may obtain tu_mts_flag based on sps_mts_intra_enabled_flag or sps_mts_inter_enabled_flag (S1120). For example, when sps_mts_intra_enabled_flag=1 or sps_mts_inter_enabled_flag=1, the decoder may obtain tu_mts_flag. Here, tu_mts_flag indicates whether multiple transform selection (hereinafter, referred to as "MTS") is applied to a residual sample of a luma transform block. For example, when tu_mts_flag=0, the MTS is not applied to the residual sample of the luma transform block and when tu_mts_flag=1, the MTS is applied to the residual sample of the luma transform block.

As another example, at least one of the embodiments of the present document may be applied to the tu_mts_flag.

The decoder may obtain mts_idx based on tu_mts_flag (S1130). For example, when tu_mts_flag=1, the decoder may obtain mts_idx. Here, mts_idx indicates which transform kernel is applied to luma residual samples along the horizontal and/or vertical direction of a current transform block.

For example, at least one of the embodiments of the present document may be applied to mts_idx. As a specific example, at least one of the embodiments of FIG. 6 may be applied.

The decoder may derive the transform kernel corresponding to mts_idx (S1140). For example, the transform kernel corresponding to the mts_idx may be defined by being divided into the horizontal transform and the vertical transform.

As another example, different transform kernels may be applied to the horizontal transform and the vertical transform. However, the present invention is not limited thereto, and the same transform kernel may be applied to the horizontal transform and the vertical transform.

As an embodiment, mts_idx may be defined as shown in Table 1 below.

TABLE 1

| mts_idx[ x0 ][y0 ] | trTypeHor | trTypeVer |
|---|---|---|
| 0 | 0 | 0 |
| 1 | 1 | 1 |
| 2 | 2 | 1 |
| 3 | 1 | 2 |
| 4 | 2 | 2 |

In addition, the decoder may perform the inverse transform based on the transform kernel (S1150).

In FIG. 11 above, an embodiment is primarily described in which tu_mts_flag is obtained to determine whether to apply MTS and mts_idx is obtained according to a tu_mts_flag value which is obtained later to determine the transform kernel, but the present invention is not limited thereto. As an example, the decoder parses mts_idx directly without parsing tu_mts_flag to determine the transform kernel. In this case, Table 1 described above may be used. That is, when the mts_idx value indicates 0, DCT-2 may be applied in the horizontal/vertical direction and when the mts_idx value indicates a value other than 0, DST-7 and/or DCT-8 may be applied according to the mts_idx value.

As another embodiment of the present invention, a decoding process of performing the transform process is described.

The decoder may check a transform size nTbS (S10). Here, the transform size nTbS may be a variable representing a horizontal sample size of scaled transform coefficients.

The decoder may check a transform kernel type trType (S20). Here, the transform kernel type trType may be a variable representing the type of transform kernel and various embodiments of the present document may be applied. The transform kernel type trType may include a horizontal transform kernel type trTypeHor and a vertical transform kernel type trType Ver.

Referring to Table 1, when the transform kernel type trType is 0, the transform kernel type may represent DCT2, when the transform kernel type trType is 1, the transform kernel type may represent DST7, and when the transform kernel type trType is 2, the transform kernel type may represent DCT8.

The decoder may perform a transform matrix multiplication based on at least one of the transform size nTbS or the transform kernel type (S30).

As another example, when the transform kernel type is 1 and the transform size is 4, a predetermined transform matrix 1 may be applied when performing the transform matrix multiplication.

As another example, when the transform kernel type is 1 and the transform size is 8, a predetermined transform matrix 2 may be applied when performing the transform matrix multiplication.

As another example, when the transform kernel type is 1 and the transform size is 16, a predetermined transform matrix 3 may be applied when performing the transform matrix multiplication.

As another example, when the transform kernel type is 1 and the transform size is 32, a predefined transform matrix 4 may be applied when performing the transform matrix multiplication.

Similarly, when the transform kernel type is 2 and the transform size is 4, 8, 16, or 32, predefined transform matrices 5, 6, 7, and 8 may be applied, respectively.

Here, each of the predefined transform matrices 1 to 8 may correspond to any one of various types of transform matrices. As an example, the transform matrix of the type illustrated in FIG. 6 may be applied.

The decoder may derive a transform sample (or transform coefficient) based on transform matrix multiplication (S40).

Each of the above embodiments may be used, but the present invention is not limited thereto, and may be used in combination with the above embodiments and other embodiments of this specification.

FIG. 12 is a table showing allocation of a transform set for each intra prediction mode in an NSST as an embodiment to which the present invention is applied.

Non-Separable Secondary Transform (NSST)

The secondary transform unit may apply the secondary transform to a primary transformed signal and here, the secondary transform may be defined in the table in the encoder and/or the decoder.

As an embodiment, the secondary transform may conditionally adopt a non-separable secondary transform (hereinafter, referred to as 'NSST'). For example, the NSST may be applied only to the intra-prediction block and may have a transform set applicable to each prediction mode group.

Here, the prediction mode group may be configured based on symmetry with respect to a prediction direction. For example, since prediction mode 52 and prediction mode 16 are symmetrical based on prediction mode 34 (diagonal direction), the same transform set may be applied by forming one group. In this case, when the transform for prediction mode 52 is applied, input data is transposed and then applied because prediction mode 52 has the same transform set as prediction mode 16.

Meanwhile, since the symmetry for the direction does not exist in the case of a planar mode and a DC mode, each mode has a different transform set and the corresponding transform set may be constituted by two transforms. In respect to the remaining direction modes, each transform set may be constituted by three transforms. However, the present invention is not limited thereto, and each transform set may be constituted by a plurality of transforms.

In an embodiment, a transform set table other than that illustrated in FIG. 12 may be defined. For example, as shown in Table 2 below, the transform set may be determined from a predefined table according to an intra prediction mode (or an intra prediction mode group). A syntax indicating a specific transform in the transform set determined according to the intra prediction mode may be signaled from the encoder to the decoder.

TABLE 2

| IntraPredMode | Tr. set index |
| --- | --- |
| IntraPredMode < 0 | 1 |
| 0 <= IntraPredMode <= 1 | 0 |
| 2 <= IntraPredMode <= 12 | 1 |
| 13 <= IntraPredMode <= 23 | 2 |
| 24 <= IntraPredMode <= 44 | 3 |
| 45 <= IntraPredMode <= 55 | 2 |
| 56 <= IntraPredMode | 1 |

Referring to Table 2, a predefined transform set may be allocated to the grouped intra prediction modes (or intra prediction mode groups). Here, the IntraPredMode value may be a mode value transformed in consideration of Wide Angle Intra Prediction (WAIP).

FIG. 13 is a calculation flow diagram for givens rotation as an embodiment to which the present invention is applied.

As another embodiment, the NSST may not be applied to the entire primary transformed block but may be applied only to a top-left 8×8 region. For example, when the block size is 8×8 or more, 8×8 NSST is applied and when the block size is less than 8×8, 4×4 NSST is applied and in this case, the block is divided into 4×4 blocks and then, the 4×4 NSST is applied to each of the divided blocks.

As another embodiment, even in the case of 4×N/N×4 (N>=16), the 4×4 NSST may be applied.

Since both the 8×8 NSST and the 4×4 NSST follow a transformation combination configuration described in this document and are the non-separable transforms, the 8×8 NSST receives 64 data and outputs 64 data and the 4×4 NSST has 16 inputs and 16 outputs.

Both the 8×8 NSST and the 4×4 NSST are configured by a hierarchical combination of Givens rotations. A matrix corresponding to one Givens rotation is shown in Equation 4 below and a matrix product is shown in Equation 5 below.

$$R_0 = \begin{bmatrix} \cos\theta & -\sin\theta \\ \sin\theta & \cos\theta \end{bmatrix} \qquad \text{[Equation 4]}$$

$$t_m = x_m \cos\theta - x_n \sin\theta \qquad \text{[Equation 5]}$$
$$t_n = x_m \sin\theta - x_n \cos\theta$$

As illustrated in FIG. 13, since one Givens rotation rotates two data, in order to process 64 data (for the 8×8 NSST) or 16 data (for the 4×4 NSST), a total of 32 or 8 Givens rotations are required.

Therefore, a bundle of 32 or 8 is used to form a Givens rotation layer. Output data for one Givens rotation layer is transferred as input data for a next Givens rotation layer through a determined permutation.

FIG. 14 illustrates one round configuration in 4×4 NSST constituted by a givens rotation layer and permutations as an embodiment to which the present invention is applied.

Referring to FIG. 14, it is illustrated that four Givens rotation layers are sequentially processed in the case of the 4×4 NSST. As illustrated in FIG. 14, the output data for one Givens rotation layer is transferred as the input data for the next Givens rotation layer through a determined permutation (i.e., shuffling).

As illustrated in FIG. 14, patterns to be permutated are regularly determined and in the case of the 4×4 NSST, four Givens rotation layers and the corresponding permutations are combined to form one round.

In the case of the 8×8 NSST, six Givens rotation layers and the corresponding permutations form one round. The 4×4 NSST goes through two rounds and the 8×8 NSST goes through four rounds. Different rounds use the same permutation pattern, but applied Givens rotation angles are different. Accordingly, angle data for all Givens rotations constituting each transform need to be stored.

As a last step, one permutation is further finally performed on the data output through the Givens rotation layers, and corresponding permutation information is stored separately for each transform. In forward NSST, the corresponding permutation is performed last and in inverse NSST, a corresponding inverse permutation is applied first on the contrary thereto.

In the case of the inverse NSST, the Givens rotation layers and the permutations applied to the forward NSST are performed in the reverse order and rotation is performed by taking a negative value even for an angle of each Givens rotation.

FIG. 15 is a block diagram for describing operations of forward reduced transform and inverse reduced transform as an embodiment to which the present invention is applied.
Reduced Secondary Transform (RST)

When it is assumed that an orthogonal matrix representing one transform has an N×N form, a reduced transform (hereinafter, referred to as 'RT') leaves only R transform basis vectors among N transform basis vectors (R<N). A matrix for forward RT generating the transform coefficients is given by Equation 6 below.

$$T_{R \times N} = \begin{bmatrix} t_{11} & t_{12} & t_{13} & \cdots & t_{1N} \\ t_{21} & t_{22} & t_{23} & & t_{2N} \\ \vdots & & & \ddots & \vdots \\ t_{R1} & t_{R2} & t_{R3} & \cdots & t_{RN} \end{bmatrix} \qquad \text{[Equation 6]}$$

Since a matrix for an inverse RT becomes a transpose matrix of the forward RT matrix, the application of the forward RT and the inverse RT is illustrated as illustrated in FIG. 15. Here, a reduction factor is defined as R/N (R<N).

The number of elements of the reduced transform is R*N, which is smaller than the size of the entire matrix (N*N). In other words, a required matrix is R/N of the entire matrix. Further, the number of required multiplications is R×N and is lower than the original N×N by R/N. When the reduced transform is applied, R coefficients are provided, and as a result, only R coefficient values may be transmitted instead of N coefficients.

Assuming a case of applying the RT to the top-left 8×8 block of the transform block which goes through the primary transform is assumed, the RT may be referred to as an 8×8 reduced secondary transform (8×8 RST).

When the R value of Equation 6 above is 16, the forward 8×8 RST has a 16×64 matrix form and the inverse 8×8 RST has a 64×16 matrix form.

Further, the transform set configuration which is the same as that illustrated in FIG. 12 may be applied even to the 8×8 RST. That is, a corresponding 8×8 RST may be applied according to the transform set in FIG. 12.

As an embodiment, when one transform set is constituted by two or three transforms according to the intra prediction mode in FIG. 12, one of a maximum of 4 transforms including a case of not applying the secondary transform may be configured to be selected. Here, one transform may be regarded as an identity matrix.

When indexes of 0, 1, 2, and 3 are assigned to the four transforms, respectively, a syntax element called an NSST index may be signaled for each transform block, thereby designating a corresponding transform. That is, in the case of the NSST, the 8×8 NSST may be designated for the 8×8 top-left block through the NSST index and the 8×8 RST may be designated in an RST configuration. Further, in this case, index 0 may be allocated to a case where the identity matrix, i.e., the secondary transform is not applied.

When the forward 8×8 RST shown in Equation 6 is applied, 16 valid transform coefficients are generated, and as a result, it may be regarded that 64 input data constituting an 8×8 region are reduced to 16 output data. From the perspective of a two-dimensional region, only a one-quarter region is filled with the valid transform coefficient. Accordingly, a 4×4 top-left region in FIG. 16 may be filled with 16 output data obtained by applying the forward 8×8 RST.

FIG. 16 is a diagram illustrating a process of performing backward scan from 64th to 17th according to a backward scan order as an embodiment to which the present invention is applied.

FIG. 16 illustrates scanning from the 17th coefficient to the 64th coefficient when the forward scanning order starts from 1 (in the forward scanning order). However, FIG. 16 illustrates the backward scan and this illustrates performing the backward scanning from the 64th coefficient to the 17th coefficient.

Referring to FIG. 16, the top-left 4×4 region is a region of interest (ROI) to which the valid transform coefficient is allocated and the remaining region is empty. That is, a value of 0 may be allocated to the remaining region by default.

If there is a valid transform coefficient other than 0 in a region other than the ROI region of FIG. 16, this means that the 8×8 RST is not applied, and as a result, in this case, NSST index coding corresponding thereto may be omitted.

Conversely, if there is no non-zero transform coefficient outside of the ROI region of FIG. 16 (if the 8×8 RST is applied, when 0 is allocated to the region other than the ROI), there is a possibility that the 8×8 RST will be applied, and as a result, the NST index may be coded.

As such, conditional NSST index coding may be performed after the residual coding process because it is necessary to check the existence of the non-zero transform coefficient.

The present invention provides a method for designing an RST and associated optimization methods which may be applied to the 4×4 block from an RST structure. The embodiments disclosed in this specification may be applied to the 8×8 RST or another type of transform in addition to the 4×4 RST.

FIG. 17 illustrates three forward scan orders for a transform coefficient block (transform block) as an embodiment to which the present invention is applied.

Embodiment 1: RST Applicable to 4×4 Block

A non-separable transform that may be applied to one 4×4 block is a 16×16 transform. That is, when data elements constituting the 4×4 block are arranged in a row-first or column-first order, a 16×1 vector is used to apply the non-separable transform.

The forward 16×16 transform is constituted by 16 row-wise transformed basis vectors and when an inner product is applied to the 16×1 vector and each transform basis vector, the transform coefficient for the transform basis vector is obtained. A process of obtaining transform coefficients corresponding to all of 16 transform basis vectors is equivalent to multiplying the 16×16 non-separable transform matrix by the input 16×1 vector.

The transform coefficients obtained by the matrix product have a 16×1 vector form, and statistical characteristics may be different for each transform coefficient. For example, when a 16×1 transform coefficient vector is constituted by a 0th element to a 15th element, a variance of the 0th element may be greater than the variance of the 15th element. In other words, as the element is positioned former, a corresponding variance value of the element is larger, so that the element may have a larger energy value.

When the inverse 16×16 non-separable transform is applied from the 16×1 transform coefficient, an original 4×4 block signal may be restored. When the forward 16×16 non-separable transform is an orthonormal transform, the corresponding inverse 16×16 transform may be obtained through the transpose matrix for the forward 16×16 transform.

When the 16×1 transform coefficient vector is multiplied by the inverse 16×16 non-separable transform matrix, data in the form of the 16×1 vector may be obtained and when the obtained data are arranged in the row-first or column-first order which is first applied, the 4×4 block signal may be restored.

As described above, elements constituting the 16×1 transform coefficient vector may have different statistical characteristics.

If transform coefficients arranged at a former side (close to an 0th element) have larger energy, a signal may be restored, which is quite close to the original signal even though the inverse transform is applied to some transform coefficients which first appear without using all transform coefficients. For example, when the inverse 16×16 non-separable transform is constituted by 16 column basis vectors, only L column basis vectors are left to form a 16×L matrix. In addition, when a 16×L matrix and an L×1 are multiplied by each other after only L important transform coefficients among the transform coefficients (L×1 vector), the 16×1 vector may be restored, which has a small error from original input 16×1 vector data.

As a result, since only L coefficients are used for data restoring, the L×1 transform coefficient vector is obtained instead of the 16×1 transform coefficient vector when obtaining the transform coefficient. That is, when an L×16 transform is configured by selecting L corresponding row-wise vectors in the forward 16×16 non-separable transform matrix and the configured L×16 transform is multiplied by the 16×1 input vector, L important transform coefficients may be obtained.

The L value has a range of 1≤ L<16 and in general, L vectors may be selected by an arbitrary method among 16 transform basis vectors, but it may be advantageous in terms of coding efficiency to select transform basis vectors having a high importance in terms of energy of the signal from the viewpoint of coding and decoding.

Embodiment 2: Configuration of Application Region of 4×4 RST and Arrangement of Transform Coefficients The 4×4 RST may be applied as the secondary transform, and may be applied secondarily to a block to which a primary transform such as DCT-type 2 is applied. When the size of the block to which the primary transform is applied is N×N, the size of the block to which the primary transform is applied is generally larger than 4×4. Therefore, when applying the 4×4 RST to the N×N block, there may two methods as follows.

Embodiment 2-1

The 4×4 RST is not applied to all N×N regions, but may be applied only to some regions. For example, the 4×4 RST may be applied only to the top-left M×M region (M≤N).

Embodiment 2-2

A region to which the secondary transform is to be applied may be divided into 4×4 blocks and then the 4×4 RST may be applied to each divided block.

As an embodiment, embodiments 2-1) and 2-2) may be mixed and applied. For example, only the top-left M×M region may be divided into 4×4 blocks and then the 4×4 RST may be applied.

As an embodiment, the secondary transform may be applied only to the top-left 8×8 region and when N×N block is equal to or larger than 8×8, the 8×8 RST may be applied and when the N×N block is smaller than 8×8 (4×4, 8×4, and 4×8), the N×N block may be divided into 4×4 blocks and then the 4×4 RST may be applied to each of 4×4 blocks as in embodiment 2-2). Further, even in the case of 4×N/N×4 (N>=16), the 4×4 NSST may be applied.

When L (1≤L<16) transform coefficients are generated after applying the 4×4 RST, a degree of freedom for how the L transform coefficients are arranged is generated. However, since there will be a predetermined order when processing the transform coefficient in a residual coding step, coding performance may vary depending on how the L transform coefficients are arranged in a 2D block.

For example, in the case of residual coding of HEVC, coding starts from a position farthest from a DC position. This is to enhance the coding performance by taking advantage of a fact that a quantized coefficient value is zero or close to zero as moving away from the DC position.

Therefore, it may be advantageous in terms of the coding performance to arrange more important coefficients with high energy for the L transform coefficients so that the L transform coefficients are coded later in the order of residual coding.

FIG. 17 illustrates three forward scan orders in units of a 4×4 transform block (coefficient group (CG) applied in HEVC. The residual coding follows the reverse order of the scan order of FIG. 17 (i.e., coding is performed in the order of 16 to 1).

Since three scan orders presented in FIG. 17 are selected according to the intra prediction mode, the present invention may be configured to determine the scan order according to the intra prediction mode similarly even for the L transform coefficients.

FIG. 18 illustrates positions of valid transform coefficients and a forward scan order for each of 4×4 blocks when diagonal scan is applied and 4×4 RST is applied in top-left 4×8 blocks as an embodiment to which the present invention is applied.

When following a diagonal scan order in FIG. 17 and dividing the top-left 4×8 block into 4×4 blocks and applying the 4×4 RST to each 4×4 block, if the L value is 8 (i.e., if only 8 transform coefficients among 16 transform coefficients are left), the transform coefficients may be positioned as in FIG. 18.

Only half of respective 4×4 blocks may have the transform coefficients and a value of 0 may be applied to positions marked with X by default.

Accordingly, the residual coding is performed by arranging L transform coefficients for each 4×4 block according to the scan order illustrated in FIG. 17 and assuming that 16–L remaining positions of each 4×4 block are filled with zeros.

FIG. 19 illustrates a case where valid transform coefficients of two 4×4 blocks are combined into one 4×4 block when diagonal scan is applied and 4×4 RST is applied in top-left 4×8 blocks as an embodiment to which the present invention is applied.

Referring to FIG. 19, L transform coefficients arranged in two 4×4 blocks may be combined into one. In particular, when the L value is 8, since the transform coefficients of two 4×4 blocks are combined while completely filling one 4×4 block, no transform coefficient is also left in the other one 4×4 block.

Accordingly, since most residual coding is not required with respect to the empty 4×4 block, corresponding coded_sub_block_flag may be coded with 0.

Further, as an embodiment of the present invention, various schemes may be applied even to how transform coefficients of two 4×4 blocks are mixed. The transform coefficients may be combined according to a random order, but the present invention may provide the following methods.

1) The transform coefficients two 4×4 blocks are alternately mixed in the scan order. That is, in FIG. 18, when the transform coefficients for a top block are $c_0^u$, $c_1^u$, $c_2^u$, $c_3^u$, $c_4^u$, $c_5^u$, $c_6^u$ and $c_7^u$ and the transform coefficients for a bottom block are $c_0^l$, $c_1^l$, $c_2^l$, $c_3^l$, $c_4^l$, $c_5^l$, $c_6^l$, and $c_7^l$ the transform coefficients may be alternately mixed one by one like $c_0^u$, $c_0^l$, $c_1^u$, $c_1^l$, $c_2^u$, $c_2^l$, . . . , $c_7^u$ and $c_7^l$. Alternatively, the order of $c_\#^u$ and $c_\#^l$ may be changed. In other words, the order may be configured so that $c_\#^l$ appears first.

2) The transform coefficients for a first 4×4 block may be first arranged and then the transform coefficients for a second 4×4 block may be arranged. In other words, the transform coefficients may be connected and arranged like $c_0^u$, $c_1^u$, . . . , $c_7^u$, $c_0^u$, $c_1^u$, . . . , and $c_7^u$. Alternatively, the order may be changed like $c_0^l$, $c_1^l$, . . . , $c_7^l$, $c_0^u$, $c_1^u$, . . . , and $c_7^u$.

Embodiment 3: Method for Coding NSST Index for 4×4 RST

When the 4×4 RST is applied as illustrated in FIG. 18, L+1-th to 16-th may be filled with the 0 value according to the transform coefficient scan order for each 4×4 blocks.

Accordingly, when a non-zero value is generated at L+1-th to 16-th positions even in one of two 4×4 blocks, it may be known that this case is a case where the 4×4 RST is not applied.

When the 4×4 RST also has a structure in which one of the transform sets prepared as the NSST is selected and applied, a transform index (which may be referred to as an NSST index in the embodiment) for which transform to apply may be signaled.

It is assumed that any decoder may know the NSST index through bitstream parsing and the parsing is performed after residual decoding.

When the residual decoding is performed and it is confirmed that at least one non-zero transform coefficient exists between L+1-th to 16-th, the 4×4 RST is not applied, and thus the NSST index may be configured to not be parsed.

Accordingly, the NSST index is selectively parsed only when necessary to reduce signaling cost.

If the 4×4 RST is applied to a plurality of 4×4 blocks in a specific region as illustrated in FIG. 18 (for example, the same 4×4 RST may be applied to all of the plurality of 4×4 blocks or different 4×4 RSTs may be applied), the 4×4 RST applied to the all 4×4 blocks may be designated through one NSST index. In this case, the same 4×4 RST may be designated or the 4×4 RST applied to each of all 4×4 blocks may be designated.

Since whether the 4×4 RST is applied to the all 4×4 blocks by one NSST index, it may be checked whether non-zero transform coefficients exist at L+1-th to 16-th positions for the all 4×4 blocks during a residual decoding process. As a checking result, when the non-zero transform coefficient exists at a position (L+1-th to 16-th positions) which is not accepted even in one 4×4 block, the NSST index may be configured to not be coded.

The NSST index may be signaled separately for the luma block and the chroma block, and in the case of the chroma block, separate NSST indexes may be signaled for Cb and Cr, and one NSST index may be shared.

When one NSST index is shared for Cb and Cr, 4×4 RST designated by the same NSST index may be applied. In this case, the 4×4 RSTs for Cb and Cr may be the same or the NSST index may be the same, but separate 4×4 RSTs may be provided.

To apply the conditional signaling to the shared NSST index, it is checked whether non-zero transform coefficients exist at L+1-th to 16-th for all 4×4 blocks for Cb and Cr and when the non-zero transform coefficient exists, the NSST index may be configured to not be signaled.

As illustrated in FIG. 19, even for a case where the transform coefficients for two 4×4 blocks are combined, it is checked whether the non-zero transform coefficient exists at a position where the valid transform coefficient does not exist when the 4×4 RST is applied and then it may be determined whether the NSST is signaled.

For example, as illustrated in FIG. 19(*b*), when the L value is 8 and the valid transform coefficients do not exist for one 4×4 blocks at the time of applying the 4×4 RST (a block marked with X), coded_sub_block_flag of a block where the valid transform coefficients do not exist may be checked. In this case, when coded_sub_block_flag is 1, the NSST index may be configured to not be signaled.

Embodiment 4: Optimization Method for Case where Coding for NSST Index is Performed Before Residual Coding When coding for the NSST index is performed before residual coding, whether to apply the 4×4 RST is predetermined, and as a result, residual coding may be omitted for positions whether 0 is allocated to the transform coefficient.

Here, whether to apply the 4×4 RST may be configured to be known through the NSST index. For example, when the NSST index is 0, the 4×4 RST is not applied.

Alternatively, the NSST index may be signaled through a separate syntax element (e.g., NSST flag). For example, if a separate syntax element is called the NSST flag, the NSST flag is parsed first to determine whether the 4×4 RST is applied, and if the NSST flag value is 1, the residual coding may be omitted for positions where no valid transform coefficient may exist.

As an embodiment, when the residual coding is performed, a last non-zero transform coefficient position on the TU is coded first. When the coding for the NSST index is performed after coding the last non-zero transform coefficient position and it is assumed that the 4×4 RST is applied to the position of the last non-zero transform coefficient, if the last non-zero transform coefficient position is determined as a position where the non-zero transform coefficient may not be generated, the 4×4 RST may be configured not to be applied to the last non-zero transform coefficient position without coding the NSST index.

For example, since in the case of positions marked with X in FIG. 18, valid transformation coefficients are not positioned when the 4×4 RST is applied (e.g., the positions may be filled with zero values), when the last non-zero transform coefficient is positioned in the region marked with X, the coding for the NSST index may be omitted. When the last non-zero transform coefficient is not positioned in the region marked with X, the coding of the NSST index may be performed.

As an embodiment, when it is checked whether to apply the 4×4 RST by conditionally coding the NSST index after the coding for the last non-zero transform coefficient position, the remaining residual coding portion may be processed by two following schemes.

1) In case of not applying the 4×4 RST, general residual coding is kept as it is. That is, the coding is performed under the assumption that the non-zero transform coefficient may exist at any position from the non-zero transform coefficient position to DC.

2) When the 4×4 RST is applied, since no transform coefficient exists for a specific position or a specific 4×4 block (e.g., an X position of FIG. 18, which may be filled with 0 by default), the residual for the corresponding position or block may not be performed.

For example, in a case of reaching the position marked with X in FIG. 18, coding for sig_coeff_flag may be omitted. Here, sig_coeff_flag means a flag for whether the non-zero transform coefficient exists at a corresponding position.

When transform coefficients of two blocks are combined as illustrated in FIG. 19, the coding for coded_sub_block_flag may be omitted for the 4×4 blocks allocated to 0 and a corresponding value may be derived to 0 and all corresponding 4×4 blocks may be derived to zero values without separate coding.

In a case where the NSST index is coded after coding the non-zero transform coefficient position, when an x position Px and a y position Py of the last non-zero transform coefficient are smaller than Tx and Ty, respectively, the NSST index coding may be omitted and the 4×4 RST may not be applied.

For example, a case of Tx=1 and Ty=1 means that the NSST index coding is omitted for a case where the non-zero transform coefficient exists at the DC position.

A scheme of determining whether to code the NSST index through comparison with the threshold may be differently applied to luma and chroma. For example, different Tx and Ty may be applied to the luma and the chroma and the threshold may be applied to the luma and not applied to the chroma. Or vice versa.

Two methods described above, that is, a first method for omitting the NSST index coding when the non-zero transform coefficient is located in a region where the valid transform coefficient does not exist and a second method for omitting the NSST index coding when each of an X coordinate and a Y coordinate for the non-zero transform coefficient is smaller than a predetermined threshold may be simultaneously applied.

For example, a threshold for a position coordinate of the last non-zero transform coefficient may be first checked and then it may be checked whether the last non-zero transform coefficient is located in the region where the valid transform coefficient does not exist. Alternatively, the order may be changed.

Methods presented in Embodiment 4 may be applied even to the 8×8 RST. That is, when the last non-zero transform coefficient is located in a region other than the top-left 4×4 in the top-left 8×8 region, the coding for the NSST index may be omitted and if not, the NSST index coding may be performed.

Further, when both X and Y coordinate values for the non-zero transform coefficient are less than a threshold, the coding for the NSST index may be omitted. Alternatively, two methods may be applied together.

Embodiment 5: Applying Different NSST Index Coding and Residual Coding Schemes to Luma and Chroma when Applying RST The schemes described in Embodiments 3 and 4 may be differently applied to luma and chroma, respectively. That is, the NSST index coding and residual coding schemes for the luma and the chroma may be differently applied.

For example, the luma may adopt the scheme of Embodiment 4 and the chroma may adopt the scheme of Embodiment 3. Alternatively, the luma may adopt the conditional NSST index coding presented in Embodiment 3 or 4 and the chroma may not adopt the conditional NSST index coding. Or vice versa.

FIG. 20 is a flowchart of encoding a video signal based on reduced secondary transform as an embodiment to which the present invention is applied.

The encoder may determine (or select) the forward secondary transform based on at least one of the prediction mode, the block shape, and/or the block size of the current block (S2010). In this case, a candidate of the forward secondary transform may include at least one of the embodiments of FIG. 6 and/or FIG. 12.

The encoder may determine an optimal forward secondary transform through Rate Distortion optimization. The optimal forward secondary transform may correspond to one of a plurality of transform combinations and the plurality of transform combinations may be defined by a transform index. For example, for the RD optimization, results of performing all of the forward secondary transform, quantization, residual coding, etc., may be compared for respective candidates. In this case, an equation such as cost=rate+$\lambda$·distortion or cost=distortion+$\lambda$·rate may be used, but the present invention is not limited thereto.

The encoder may signal a secondary transform index corresponding to the optimal forward secondary transform (S2020). Here, the secondary transform index may adopt other embodiments described in this specification.

For example, the secondary transform index may adopt the transform set configuration of FIG. 12. Since one transform set is constituted by two or three transforms according to the intra prediction mode, one of a maximum of four transforms may be configured to be selected in addition to a case of not applying the secondary transform. When indexes of 0, 1, 2, and 3 are assigned to the four transforms, respectively, an applied transform may be designated by signaling the secondary transform index for each transform coefficient block. In this case, index 0 may be allocated to a case where the identity matrix, i.e., the secondary transform is not applied.

As another embodiment, the signaling of the secondary transform index may be performed in any one step of 1) before residual coding, 2) in the middle of residual coding (after coding the non-zero transform coefficient position), or 3) after residual coding. The embodiments will be described below in detail.

1) Method for Signaling Secondary Transform Index Before Residual Coding

The encoder may determine the forward secondary transform.

The encoder may signal the secondary transform index corresponding to the forward secondary transform.

The encoder may code the position of the last non-zero transform coefficient.

The encoder may perform residual coding for syntax elements other than the position of the last non-zero transform coefficient.

2) Method for Signaling Secondary Transform Index in Middle of Residual Coding

The encoder may determine the forward secondary transform.

The encoder may code the position of the last non-zero transform coefficient.

When the non-zero transform coefficient is not located in a specific region, the encoder may code the secondary transform index corresponding to the forward secondary transform. Here, in the case where the reduced secondary transform is applied, the specific region represents a remaining region other than the position where the non-zero transform coefficient may exist when the transform coefficients are arranged according to the scan order. However, the present invention is not limited thereto.

The encoder may perform residual coding for syntax elements other than the position of the last non-zero transform coefficient.

3) Method for Signaling Secondary Transform Index Before Residual Coding

The encoder may determine the forward secondary transform.

The encoder may code the position of the last non-zero transform coefficient.

When the non-zero transform coefficient is not located in a specific region, the encoder may perform residual coding for syntax elements other than the position of the last non-zero transform coefficient. Here, in the case where the reduced secondary transform is applied, the specific region represents a remaining region other than the position where the non-zero transform coefficient may exist when the transform coefficients are arranged according to the scan order. However, the present invention is not limited thereto.

The encoder may code the secondary transform index corresponding to the forward secondary transform.

Meanwhile, the encoder may perform the forward first order transform for the current block (residual block) (S2030). Here, step S2010 and/or step S2020 may be similarly applied to the forward primary transform.

The encoder may perform the forward secondary transform for the current block by using the optimal forward secondary transform (S2040). For example, the optimal forward secondary transform may be the reduced secondary transform. The reduced secondary transform refers to a transform in which N residual data (N×1 residual vectors) are input and L (L<N) transform coefficient data (L×1 transform coefficient vectors) are output.

As an embodiment, the reduced secondary transform may be applied to a specific region of the current block. For example, when the current block is N×N, the specific region may mean a top-left N/2×N/2 region. However, the present invention is not limited thereto and may be differently configured according to at least one of the prediction mode, the block shape, or the block size. For example, when the current block is N×N, the specific region may mean a top-left M×M region (M≤N).

Meanwhile, the encoder performs quantization for the current block to generate a transform coefficient block (S2050).

The encoder performs entropy encoding for the transform coefficient block to generate the bitstream.

FIG. 21 is a flowchart of decoding a video signal based on reduced secondary transform as an embodiment to which the present invention is applied.

The decoder may obtain the secondary transform index from the bitstream (S2110). Here, the secondary transform index may adopt other embodiments described in this specification. For example, the secondary transform index may include at least one of the embodiments of FIG. 6 and/or FIG. 12.

As another embodiment, the obtaining of the secondary transform index may be performed in any one step of 1) before residual coding, 2) in the middle of residual coding (after decoding the non-zero transform coefficient position), or 3) after residual coding.

The decoder may derive the secondary transform corresponding to the secondary transform index (S2120). In this case, the candidate of the forward secondary transform may include at least one of the embodiments of FIG. 6 and/or FIG. 12.

However, steps S2110 and S2120 are embodiments and the present invention is not limited thereto. For example, the decoder may not obtain the secondary transform index, but derive the secondary transform based on at least one of the prediction mode, the block shape, and/or the block size of the current block.

Meanwhile, the decoder may obtain the transform coefficient block by entropy-decoding the bitstream and perform dequantization for the transform coefficient block (S2130).

The decoder may perform the inverse secondary transform for the dequantized transform coefficient block (S2140). For example, the inverse secondary transform may be the reduced secondary transform. The reduced secondary transform refers to a transform in which N residual data (N×1 residual vectors) are input and L (L<N) transform coefficient data (L×1 transform coefficient vectors) are output.

As an embodiment, the reduced secondary transform may be applied to a specific region of the current block. For example, when the current block is N×N, the specific region may mean a top-left N/2×N/2 region. However, the present invention is not limited thereto and may be differently configured according to at least one of the prediction mode, the block shape, or the block size. For example, when the current block is N×N, the specific region may mean a top-left M×M region (M≤N) or M×L (M≤N, L≤N).

In addition, the decoder may perform the inverse primary transform for the inverse secondary transform result (S2150).

The decoder generates the residual block through step S2150 and the residual block and the prediction block are added to generate a reconstruction block.

Embodiment 6: Reduced Multiple Transform Selection (MTS)

An embodiment of the present invention proposes a method for improving complexity by applying the primary transform only to a predefined region. The complexity may increase when combinations of various transforms (or transform kernels) (e.g., DCT2, DST7, DCT8, DST1, DCT5, etc.) such as MTS is optionally applied to the primary transform. In particular, as the size of the coding block (or transform block) increases, various transforms need to be considered, thereby remarkably increasing the complexity.

Accordingly, the present invention proposes a method for performing the transform only for a predefined region according to a specific condition, rather than performing (or applying) the transform for all regions in order to reduce the complexity.

As an embodiment, based on the method of reduced transform (RT) described above with reference to FIGS. 15 to 21, the encoder/decoder may obtain a transform block having an R×R size by performing the transform for a region having an R×R (M>=R) size instead of obtaining a transform block having an M×M size by performing the transform only for a region having an R×R (M>=R) size. As an example, the R×R region may be a top-left R×R region in the current block (coding block or transform block).

As a result, there may be valid coefficients (non-zero coefficients) only for the R×R region. As an example, in this case, the encoder/decoder may not perform a calculation for coefficients which exist in a region other than the R×R region, but regard values of the coefficients as 0 (zero-out).

In addition, the encoder/decoder may apply the primary transform only to a predefined region that is determined according to the size of the coding block (or transform block) and/or the type of transform (or transform kernel). Table 3 below shows a Reduced Adaptive Multiple Transform (RAMT) using a predefined R value depending on the size of the transform (or the size of the transform block). In the present invention, the Reduced Adaptive Multiple Transform (RAMT) representing the reduced transform adaptively determined according to the block size may be referred to as a Reduced Multiple Transform Selection (MTS), a Reduced explicit multiple transform, a Reduced primary transform, etc.

TABLE 3

| Transform size | Reduced transform 1 | Reduced transform 2 | Reduced transform 3 |
|---|---|---|---|
| 8 × 8 | 4 × 4 | 6 × 6 | 6 × 6 |
| 16 × 16 | 8 × 8 | 12 × 12 | 8 × 8 |
| 32 × 32 | 16 × 16 | 16 × 16 | 16 × 16 |

TABLE 3-continued

| Transform size | Reduced transform 1 | Reduced transform 2 | Reduced transform 3 |
|---|---|---|---|
| 64 × 64 | 32 × 32 | 16 × 16 | 16 × 16 |
| 128 × 128 | 32 × 32 | 16 × 16 | 16 × 16 |

Referring to Table 3, at least one reduced transform may be defined according to the size of the transform (or the size of the transform block). In an embodiment, which reduced transform is to be used among the reduced transforms shown in Table 3 may be determined according to the transform (or transform kernel) applied to the current block (coding block or transform block). Although it is assumed that three reduced transforms are used in Table 3, but the present invention is not limited thereto and one or more various reduced transforms may be predefined according to the size of the transform.

In addition, in an embodiment of the present invention, in applying the aforementioned reduced adaptive multiple transform, a reduced transform factor (R) may be dependently determined according to the primary transform. For example, when the primary transform is DCT2, a calculation amount is relatively simple compared to other primary transforms (e.g., a combination of DST7 and/or DCT8), so the reduced transform is not performed for smaller blocks or a relatively large R value is used, thereby minimizing reduction of the coding performance. Table 4 below shows a Reduced Adaptive Multiple Transform (RAMT) using a predefined R value depending on the size of the transform (or the size of the transform block) and the transform kernel.

TABLE 4

| Transform size | Reduced transform for DCT2 | Reduced transform except DCT2 |
|---|---|---|
| 8 × 8 | 8 × 8 | 4 × 4 |
| 16 × 16 | 16 × 16 | 8 × 8 |
| 32 × 32 | 32 × 32 | 16 × 16 |
| 64 × 64 | 32 × 32 | 32 × 32 |
| 128 × 128 | 32 × 32 | 32 × 32 |

Referring to Table 4, when the transform applied to the primary transform is DCT2 and other transforms (e.g., a combination of DST7 and/or DCT8), different reduced transform factors may be used.

FIG. 22 is a diagram illustrating a method for encoding a video signal by using reduced transform as an embodiment to which the present invention is applied.

Referring to FIG. 22, the encoder first determines whether to apply the transform to the current block (S2201). The encoder may encode a transform skip flag according to the determined result. In this case, encoding the transform skip flag may be included in step S2201. When the transform is applied to the current block, the encoder determines the transform kernel applied to the primary transform of the current block (S2202). The encoder may encode a transform index indicating the determined transform kernel and in this case, encoding the transform index may be included in step S2202.

The encoder determines a region where the primary transform is applied to the current block based on the transform kernel applied to the first transform of the current block and the size of the current block (S2203).

As an embodiment, the encoder may regard as 0 coefficients of the remaining region other than the region to which the primary transform is applied in the current block.

Further, as an embodiment, when the transform kernel indicated by the transform index is a predefined transform and the width and/or height of the current block is larger than a predefined size, the encoder may determine a region having the width and/or height having the predefined size as the region to which the primary transform is applied.

For example, the predefined transform may be any one of a plurality of transform combinations configured by a combination of DST7 and/or DCT8, and the predefined size may be 16. Alternatively, the predefined transform may be a remaining transform except for DCT2. Further, as an example, when the transform kernel indicated by the transform index is DCT2 and the width and/or height of the current block is larger than 32, the encoder may determine a region having a width and/or height of 32 as the region to which the primary transform is applied.

Further, as an embodiment, when the transform kernel indicated by the transform index belongs to a first transform group, the encoder may determine a smaller value of the width of the current block and a first threshold as the width of the region to which the primary transform is applied and determine a smaller value of the height of the current block and the first threshold as the height of the region to which the primary transform is applied. As an example, the first threshold may be 32, but the present invention is not limited thereto and the first threshold may be 4, 8, or 16 as shown in Table 3 or 4 described above.

In addition, when the transform kernel indicated by the transform index belongs to a second transform group, the encoder may determine a smaller value of the width of the current block and a second threshold as the width of the region to which the primary transform is applied and determine a smaller value of the height of the current block and the second threshold as the height of the region to which the primary transform is applied. As an example, the second threshold may be 16, but the present invention is not limited thereto and the second threshold may be 4, 6, 8, 12, or 32 as shown in Table 3 or 4 described above.

As an embodiment, the first transform group may include DCT2 and the second transform group may include a plurality of transform combinations configured by the combination of DST7 and/or DCT8.

The encoder performs the forward primary transform by using the transform kernel applied to the primary transform of the current block for the region to which the primary transform is applied (S2204). The encoder may obtain the primary transformed transform coefficient by performing the forward primary transform. As an embodiment, the encoder may apply the secondary transform to the primary transformed transform coefficient and in this case, the method described in FIGS. 4 to 20 above may be applied.

FIG. 23 is a diagram illustrating a method for decoding a video signal by using reduced transform as an embodiment to which the present invention is applied.

The decoder checks whether the transform skip is applied to the current block (S2301).

The decoder obtains a transform index indicating a transform kernel applied to the current block from the video signal when the transform skip is not applied to the current block (S2302).

The decoder determines a region where the primary transform is applied to the current block based on the transform kernel indicated by the transform index and the size (i.e., a width and/or a height) of the current block (S2303).

As an embodiment, the decoder may regard as 0 coefficients of the remaining region other than the region to which the primary transform is applied in the current block.

Further, as an embodiment, when the transform kernel indicated by the transform index is a predefined transform and the width and/or height of the current block is larger than a predefined size, the decoder may determine a region having the width and/or height having the predefined size as the region to which the primary transform is applied.

For example, the predefined transform may be any one of a plurality of transform combinations configured by a combination of DST7 and/or DCT8, and the predefined size may be 16. Alternatively, the predefined transform may be a remaining transform except for DCT2. Further, as an example, when the transform kernel indicated by the transform index is DCT2 and the width and/or height of the current block is larger than 32, the decoder may determine a region having a width and/or height of 32 as the region to which the primary transform is applied.

Further, as an embodiment, when the transform kernel indicated by the transform index belongs to a first transform group, the decoder may determine a smaller value of the width of the current block and a first threshold as the width of the region to which the primary transform is applied and determine a smaller value of the height of the current block and the first threshold as the height of the region to which the primary transform is applied. As an example, the first threshold may be 32, but the present invention is not limited thereto and the first threshold may be 4, 8, or 16 as shown in Table 3 or 4 described above.

In addition, when the transform kernel indicated by the transform index belongs to a second transform group, the decoder may determine a smaller value of the width of the current block and a second threshold as the width of the region to which the primary transform is applied and determine a smaller value of the height of the current block and the second threshold as the height of the region to which the primary transform is applied. As an example, the second threshold may be 16, but the present invention is not limited thereto and the second threshold may be 4, 6, 8, 12, or 32 as shown in Table 3 or 4 described above.

As an embodiment, the first transform group may include DCT2 and the second transform group may include a plurality of transform combinations configured by the combination of DST7 and/or DCT8.

The decoder performs an inverse primary transform on the region to which the primary transform is applied by using the transform kernel indicated by the transform index (S2304). The decoder may obtain a primary inversely transformed transform coefficient by performing the inverse primary transform. As an embodiment, the decoder may apply the secondary transform to a dequantized transform coefficient before performing the primary transform and in this case, the method described in FIGS. 4 to 20 above may be applied.

According to an embodiment of the present invention, only a predefined region is transformed according to a specific condition, thereby remarkably reducing worst case complexity.

Embodiment 7: MTS Primary Transform Mapping Based on Intra Prediction Mode

An embodiment of the present disclosure proposes a method of determining (or selecting) a transform used for a primary transform according to an intra prediction mode. Specifically, the encoder/decoder may allocate (or map) transform types (or transform kernels) applied to the primary transform to a TU MTS index according to the intra prediction mode.

As described above, Multiple Transform Selection (MTS) refers to a method of performing transform using at least two or more transform kernels. The MTS may be applied to a primary transform (or a core transform), may be referred to as an adaptive multiple transform (AMT) or an explicit multiple transform (EMT), and is not limited to this expression of the present disclosure. In addition, the TU MTS index may indicate a transform kernel used for the primary transform or a combination of the transform kernels (or a combination of transform types). Similarly, the TU MTS index (or MTS TU index) may be referred to as an MTS index, AMT index, EMT index, AMT TU index, EMT TU index, and the like, and the present disclosure is not limited to this expression.

FIG. 24 is a diagram illustrating a method of encoding a video signal by performing Multiple Transform Selection (MTS) based on an intra prediction mode as an embodiment to which the present disclosure is applied.

Referring to FIG. 24, first, the encoder determines whether to apply (or perform) a transform to a current block (S2401). The encoder may encode a transform skip flag according to the determined result. In this case, the step of encoding the transform skip flag may be included in step S2401.

When a transform is applied to the current block, the encoder determines transform types to be applied to a primary transform of the current block from among a plurality of predefined transform types (or transform kernels) (S2202). As an embodiment, the encoder may determine transform types (or a set of transform types or a combination of transform types) applied to the horizontal direction and the vertical direction of the current block from among a plurality of predefined transform types.

In addition, the encoder may encode a transform index (i.e. TU_MTS_index) indicating the determined transform types. In this case, the step of encoding the transform index may be included in step S2202.

In an embodiment of the present disclosure, the encoder may map (or allocate, determine) transform types applicable to the primary transform to the transform index according to the intra prediction mode. In other words, the transform types applied to the current block may be determined from among predefined transform types according to the intra prediction mode. A method of mapping a primary transform dependent on the intra prediction mode will be described in detail later.

The encoder performs a forward primary transform on the current block by using the determined transform types (S2403). The encoder may acquire primary transformed transform coefficients by performing the forward primary transform. As an embodiment, the encoder may apply a secondary transform to the primary transformed transform coefficients, and in this case, the method described above with reference to FIGS. 4 to 20 may be applied.

In one embodiment, the encoder may encode the video signal using the reduced transform described in Embodiment 6 above. That is, the encoder may determine a region where the primary transform is applied based on the transform types applied to the primary transform of the current block and a size of the current block, and perform the forward primary transform using transform types applied to the primary transform on the determined region. In this regard, a description overlapping with the method described in Embodiment 6 and FIG. 22 will be omitted.

FIG. 25 is a diagram illustrating a method of decoding a video signal by performing Multiple Transform Selection (MTS) based on an intra prediction mode as an embodiment to which the present disclosure is applied.

The decoder checks whether or not a transform skip is applied to a current block (S2501). As an embodiment, the decoder may acquire (or parse) a transform skip flag indicating whether or not the transform skip is applied.

When the transform skip is not applied to the current block, the decoder acquires a transform index (i.e. TU_MTS_index) indicating transform types applied to a primary transform of the current block from among a plurality of predefined transform types (or transform kernels) from a video signal (S2502). As an embodiment, the decoder may acquire a transform index indicating transform types (or a set of transform types or a combination of transform types) applied to the horizontal direction and the vertical direction of the current block from among a plurality of predefined transform types.

In an embodiment of the present disclosure, the decoder may map (or allocate, determine) transform types applicable to the primary transform to the transform index according to the intra prediction mode. In other words, the transform types applied to the current block may be determined from among the predefined transform types according to the intra prediction mode. A method of mapping a transform index dependent on the intra prediction mode will be described in detail later.

The decoder performs an inverse primary transform on the current block by using a transform kernel indicated by a transform index (S2503). The decoder may acquire primary inverse transformed transform coefficients by performing the inverse primary transform. As an embodiment, the decoder may apply a secondary transform to dequantized transform coefficients before performing the primary transform, and in this case, the method described above with reference to FIGS. 4 to 20 may be applied.

In one embodiment, the decoder may decode the video signal using the reduced transform described in Embodiment 6 above. That is, the decoder may determine a region where the primary transform is applied based on the transform types applied to the primary transform of the current block and a size of the current block, and perform the inverse primary transform using the transform types applied to the primary transform on the determined region. In this regard, a description overlapping with the method described in Embodiment 6 and FIG. 22 will be omitted.

Hereinafter, a method of mapping a primary transform dependent on the intra prediction mode will be described in detail.

In one embodiment of the present disclosure, for convenience of description, a method of mapping a primary transform dependent on the intra prediction mode will be described based on the case where the MTS flag and the MTS index according to the embodiments described in FIGS. 8 to 11 are used.

As an embodiment, when the value of the MTS flag (i.e. TU_MTS_flag, EMT_CU_Flag or AMT_CU_Flag) is 1, the encoder/decoder may select any one of 4 transform kernel combinations (0, 1, 2, 3) through the MTS index. The encoder/decoder may select the primary transform based on a predefined MTS index. Table 5 below shows an example of a mapping table that selects the primary transform applied to the horizontal direction and the vertical direction based on the MTS index.

TABLE 5

| MTS index | Transform for vertical direction | Transform for horizontal direction |
|---|---|---|
| 0 | 0 (DCT-8) | 0 (DCT-8) |
| 1 | 0 (DCT-8) | 1 (DST-7) |
| 2 | 1 (DST-7) | 0 (DCT-8) |
| 3 | 1 (DST-7) | 1 (DST-7) |

An embodiment of the present disclosure analyzes statistics of the primary transform occurring according to the intra prediction mode, and proposes a method of mapping a more efficient MTS primary transform based on this. First, Table 6 below shows the distribution of the MTS index for each intra prediction mode (or intra prediction mode group) as a percentage (%).

TABLE 6

| MTS index | 0 (planar mode) | 1 (DC mode) | Horizontal mode | Vertical mode |
|---|---|---|---|---|
| 0 | 53.51 | 35.86 | 53.33 | 55.32 |
| 1 | 17.34 | 23.05 | 7.59 | 31.55 |
| 2 | 19.82 | 23.80 | 33.36 | 7.73 |
| 3 | 9.26 | 17.20 | 5.73 | 5.39 |

In Table 6, the horizontal mode (or horizontal mode group) represents a mode (or mode group) having horizontal directionality from mode 2 to mode 33 based on 67 intra prediction modes, and the vertical mode represents a mode having vertical directionality from mode 34 to mode 66. It is assumed that the transform types are allocated to the MTS index of Table 6 as in the example of Table 5 described above.

Referring to Table 6, in the case of the horizontal mode, the case where the MTS index value is 2 shows a much higher occurrence probability than the case where the MTS index value is 1. Table 7 below shows an example of a mapping table that considers such occurrence probability.

TABLE 7

| | Horizontal modes | | Other cases (Vertical modes, planar, DC) | |
|---|---|---|---|---|
| MTS index | Vertical T | Horizontal T | Vertical T | Horizontal T |
| 0 | CT-8 | CT-8 | CT-8 | CT-8 |
| 1 | ST-7 | CT-8 | CT-8 | ST-7 |
| 2 | CT-8 | ST-7 | ST-7 | CT-8 |
| 3 | ST-7 | DST-7 | DST-7 | DST-7 |

Referring to Table 7, the encoder/decoder may divide horizontal modes (or a horizontal mode group) from remaining modes (or remaining mode groups) (i.e. a DC mode, a planar mode, and vertical modes), and map the transform types to the MTS index based on the occurrence probability of the transform types for each mode group.

The method of mapping the primary transform dependent on the intra prediction mode has been described above based on the case where the MTS flag and the MTS index according to the embodiments described with reference to FIGS. 8 to 11 are used, but the present disclosure is not limited thereto. That is, as described above, the decoder may immediately parse the MTS index without parsing the MTS flag to determine transform types (or a set of transform types or a combination of transform types) applied to the current block. In this case, a mapping table for selecting the primary transform applied to the horizontal direction and the vertical direction based on the MTS index may be set as shown in Table 8 below.

TABLE 8

| MTS index | Transform for vertical direction | Transform for horizontal direction |
|---|---|---|
| 0 | 0 (DCT-2) | 0 (DCT-2) |
| 1 | 1 (DST-7) | 1 (DST-7) |
| 2 | 1 (DST-7) | 2 (DCT-8) |
| 3 | 2 (DCT-8) | 1 (DST-7) |
| 4 | 2 (DCT-8) | 2 (DCT-8) |

In addition, when the transform types are allocated to the MTS index as shown in Table 8, the mapping table in Table 7 described above may be set as shown in Table 9 below in consideration of the occurrence probability of the MTS index.

TABLE 9

| | Horizontal modes | | Other cases (Vertical modes, planar, DC) | |
|---|---|---|---|---|
| MTS index | Vertical T | Horizontal T | Vertical T | Horizontal T |
| 0 | CT-2 | CT-2 | CT-2 | CT-2 |
| 1 | CT-8 | CT-8 | CT-8 | CT-8 |
| 2 | ST-7 | CT-8 | CT-8 | ST-7 |
| 3 | CT-8 | ST-7 | ST-7 | CT-8 |
| 4 | DST-7 | DST-7 | ST-7 | ST-7 |

That is, as an embodiment, the encoder/decoder may group intra prediction modes into a plurality of groups based on a prediction direction, and map the transform types applied to the horizontal direction and the vertical direction to the transform index for each of the plurality of groups. As an example, the transform types applied to the horizontal direction and the vertical direction of the current block may be determined as the transform types indicated by the transform index from among transform types defined in a group to which the intra prediction mode of the current block belongs.

In addition, in an embodiment of the present disclosure, the encoder/decoder may individually define the available values of the MTS index (or the number of the values of the MTS index) according to the intra prediction mode. In this case, the occurrence probability described in Table 6 above may be considered. For example, in the case of the planner mode, since the occurrence probability when the MTS index value is 3 (based on Table 5) is relatively very low, the MTS index value may not use (or allocate) 3. It is possible to reduce signaling bits and increase compression efficiency by excluding the value of the MTS index with a relatively low occurrence probability.

Table 10 below shows an example of an available MTS index dependent on each intra prediction mode.

TABLE 10

| | 0 (planar mode) | 1 (DC mode) | Horizontal mode | Vertical mode |
|---|---|---|---|---|
| MTS index available | 0, 1, 2 | 0, 1, 2, 3 | 0, 1 | 0, 1 |

Referring to Table 10, the horizontal mode (or horizontal mode group) represents a mode (or mode group) having horizontal directionality from mode 2 to mode 33 based on 67 intra prediction modes, and the vertical mode represents a mode having vertical directionality from mode 34 to mode 66. It is assumed that the transform types are allocated to the MTS index of Table 6 as in the example of Table 5 described above. If it is assumed that the transform types are allocated as in the example of Table 8, Table 10 may be represented as Table 11 below.

TABLE 11

| | 0 (planar mode) | 1 (DC mode) | Horizontal mode | Vertical mode |
|---|---|---|---|---|
| MTS index available | 0, 1, 2, 3 | 0, 1, 2, 3, 4 | 0, 1, 2 | 0, 1, 2 |

Referring to Tables 10 and 11, the encoder/decoder may determine transform types using the number of the values of the MTS index determined according to the intra prediction mode. In the case of the DC mode, all values of the MTS index represented in Table 5 or 8 may be used based on the fact that the combination of the transform types is relatively evenly used. As described above, in the case of the planar mode, the remaining values except for the value of one MTS index having the lowest occurrence probability may be used. And, in the case of the horizontal/vertical mode, the smallest number of the values of the MTS index may be used in consideration of the occurrence probability.

That is, as an embodiment, the encoder/decoder may map the transform types applied to the horizontal direction and the vertical direction to the transform index based on the values of the transform index available for each of the plurality of groups.

Embodiment 8: MTS Index Coding

An embodiment of the present disclosure proposes an efficient encoding method of the MTS index dependent on the intra prediction mode proposed in Embodiment 7 above. Specifically, a binarization method and a context modeling method of the MTS index dependent on the intra prediction mode proposed in Embodiment 7 are proposed.

In one embodiment, in performing binarization on the MTS index, the encoder/decoder may use truncated unary binarization instead of fixed length binarization. In other words, the encoder/decoder may code the MTS index according to an embodiment of the present disclosure using the truncated unary binarization.

Table 12 below shows an example of the fixed length binarization and the truncated unary binarization.

TABLE 12

| MTS index | Fixed Length Coding | Truncated unary (If maximum value is 3) | Truncated unary (If maximum value is 2) |
|---|---|---|---|
| 0 | 00 | 0 | 0 |
| 1 | 01 | 10 | 10 |
| 2 | 10 | 110 | 11 |
| 3 | 11 | 111 | NA |

Referring to Table 12, it is assumed that the transform types are allocated to the MTS index as in the example of Table 5 described above. As described in Table 6 above, a combination of transform types mapped to the MTS index has a different occurrence probability according to the intra prediction mode. When the MTS transform is mapped in consideration of the occurrence probability according to the intra prediction mode, a small index value may be allocated to a combination of transform types having a relatively high occurrence probability. At this time, as in the example of Table 12, by applying the truncated unary binarization method, the signaling bits may be effectively reduced. On the other hand, in the case of the MTS index as in the example of Table 8, not the MTS index as in the example of Table 5 described above, the truncated unary binarization method may be applied as well, and through this, the signaling bits may be effectively reduced.

In addition, in an embodiment, the encoder/decoder may merge the transform skip flag and the MTS index which uses the truncated unary binarization specified in Table 12 above, and may define an MTS index transmitted in units of TU as tu_mtx_idx. In this case, an example of tu_mtx_idx binarization may be represented as in Table 13 below.

TABLE 13

| tu_mtx_idx | Transform for vertical direction | Transform for horizontal direction |
| --- | --- | --- |
| 0 | Transform skip | |
| 1 | 0 (DCT-8) | 0 (DCT-8) |
| 2 | 0 (DCT-8) | 1 (DST-7) |
| 3 | 1 (DST-7) | 0 (DCT-8) |
| 4 | 1 (DST-7) | 1 (DST-7) |

In Table 13, tu_mtx_idx=0 may represent that the transform skip flag value is '0', if tu_mtx_idx is not 0, that is, if tu_mtx_idx is (1,2,3,4), the transform skip flag value may represent '1'.

The binarization of tu_mtx_idx in Tables 12 and 13 may be defined as shown in Table 14 below.

TABLE 14

| tu_mts_idx[ ][ ] | TR | cMax = 4, cRiceParam = 0 |
| --- | --- | --- |

In addition, in an embodiment, when encoding/decoding the MTS index through the context modeling, the encoder/decoder may determine the context model based on the intra prediction mode. Table 15 below illustrates various embodiments of determining the context model according to the intra prediction mode. In addition, as another example, the context modeling method for each intra prediction mode proposed in the present disclosure may be considered together with other factors (e.g. a size of a block).

TABLE 15

| Context | Method 1 | Method 2 | Method 3 |
| --- | --- | --- | --- |
| 0 | DC mode, Planar mode | DC mode | Planar mode |
| 1 | Horizontal mode | Planar mode | Horizontal mode, Vertical mode, DC mode |
| 2 | Vertical mode | Horizontal mode, Vertical mode | |

Referring to Table 15, the horizontal mode (or horizontal mode group) represents a mode (or mode group) having horizontal directionality from mode 2 to mode 33 based on 67 intra prediction modes, and the vertical mode represents a mode having vertical directionality from mode 34 to mode 66.

The embodiments of the present disclosure described above have been separately described for convenience of description, but the present disclosure is not limited thereto. That is, the embodiments described in Embodiments 1 to 12 described above may be performed independently, or may be performed by combining one or more embodiments.

FIG. 26 is a diagram illustrating an inverse transform unit according to an embodiment to which the present disclosure is applied.

In FIG. 26, an inverse transform unit is illustrated as one block for convenience of description, but an inter prediction unit may be implemented in a configuration included in an encoder and/or a decoder.

Referring to FIG. 26, the inverse transform unit implements the functions, processes and/or methods proposed in FIGS. 4 to 25 above. Specifically, the inverse transform unit may include a transform skip check unit 2601, a transform index acquiring unit 2602, and a primary inverse transform unit 2603.

The transform skip check unit 2601 checks whether or not a transform skip is applied to a current block. As an embodiment, the decoder may acquire (or parse) a transform skip flag indicating whether or not the transform skip is applied.

The transform index acquiring unit 2602 acquires a transform index (i.e. TU_MTS_index) indicating transform types applied to a primary transform of the current block from among a plurality of predefined transform types (or transform kernels) from a video signal when the transform skip is not applied to the current block. As an embodiment, the transform index acquiring unit 2602 may acquire a transform index indicating transform types (or a set of transform types and a combination of transform types) applied to the horizontal direction and the vertical direction of the current block from among the plurality of predefined transform types.

As described above with reference to Embodiments 7 and 8, the transform index acquiring unit 2602 may map (or allocate, determine) transform types applicable to the primary transform to the transform index according to an intra prediction mode. In other words, the transform type applied to the current block may be determined from among predefined transform types according to the intra prediction mode.

As an embodiment, the transform index acquisition unit may group intra prediction modes into a plurality of groups based on a prediction direction, and map the transform types applied to the horizontal direction and the vertical direction for each of the plurality of groups to the transform index.

As an embodiment, the transform types applied to the horizontal direction and the vertical direction of the current block may be determined as transform types indicated by the transform index among transform types defined in a group to which the intra prediction mode of the current block belongs.

As an embodiment, the transform index acquiring unit may map the transform type applied to the horizontal direction and the vertical direction to the transform index based on the transform index available for each of the plurality of groups.

As an embodiment, the transform index may be binarized using a truncated unary method.

As an embodiment, the primary inverse transform unit may determine a region where a primary transform is applied to the current block based on the transform type indicated by the transform index and a size of the current block, and perform the inverse primary transform using the transform type indicated by the transform index for the region where the primary transform is applied.

The inverse primary transform unit 2603 performs an inverse primary transform on the current block using a transform kernel indicated by the transform index. The inverse primary transform unit 2603 may acquire primary inverse transformed transform coefficients by performing the inverse primary transform. As an embodiment, the inverse transform unit may apply a secondary transform to dequantized transform coefficients before performing the primary transform, and in this case, the method described above with reference to FIGS. 4 to 20 may be applied.

In one embodiment, the decoder may encode the video signal using the reduced transform described in Embodiment 6 above. That is, the decoder may determine a region where the primary transform is applied based on the transform types applied to the primary transform of the current block and a size of the current block, and perform the inverse primary transform using transform types applied to the primary transform on the determined region. In this regard, a description overlapping with the method described in Embodiment 6 and FIG. 22 will be omitted.

FIG. 27 illustrates a video coding system to which the present invention is applied.

The video coding system may include a source device and a receiving device. The source device may transfer encoded video/image information or data to the receiving device through a digital storage medium or network in a file or streaming form.

The source device may include a video source, an encoding apparatus, and a transmitter. The receiving device may include a receiver, a decoding apparatus, and a renderer. The encoding apparatus may be called a video/image encoding apparatus and the decoding apparatus may be called a video/image decoding apparatus. The transmitter may be included in the encoding apparatus. The receiver may be included in the decoding apparatus. The renderer may include a display and the display may be configured as a separate device or an external component.

A video source may acquire a video/image through a capturing, synthesizing, or generating process of the video/image. The video source may include a video/image capture device and/or a video/image generation device. The video/image capture device may include, for example, one or more cameras, video/image archives including previously captured video/images, and the like. The video/image generation device may include, for example, a computer, a tablet, and a smart phone and may (electronically) generate the video/image. For example, a virtual video/image may be generated through the computer, etc., and in this case, the video/image capturing process may be replaced by a process of generating related data.

The encoding apparatus may encode an input video/image. The encoding apparatus may perform a series of procedures including prediction, transform, quantization, and the like for compression and coding efficiency. The encoded data (encoded video/image information) may be output in the bitstream form.

The transmitter may transfer the encoded video/image information or data output in the bitstream from to the receiver of the receiving device through the digital storage medium or network in the file or streaming form. The digital storage medium may include various storage media such as USB, SD, CD, DVD, Blu-ray, HDD, SSD, and the like. The transmitter may include an element for generating a media file through a predetermined file format and may include an element for transmission through a broadcast/communication network. The receiver may extract the bitstream and transfer the extracted bitstream to the decoding apparatus.

The decoding apparatus performs a series of procedures including dequantization, inverse transform, prediction, etc., corresponding to an operation of the encoding apparatus to decode the video/image.

The renderer may render a decoded video/image. The rendered video/image may be displayed through the display.

FIG. 28 is a structure diagram of a content streaming system as an embodiment to which the present invention is applied.

Referring to FIG. 28, the content streaming system to which the present invention is applied may largely include an encoding server, a streaming server, a web server, a media storage, a user device, and a multimedia input device.

The encoding server compresses contents input from multimedia input devices including a smartphone, a camera, a camcorder, etc., into digital data to serve to generate the bitstream and transmit the bitstream to the streaming server. As another example, when the multimedia input devices including the smartphone, the camera, the camcorder, etc., directly generate the bitstream, the encoding server may be omitted.

The bitstream may be generated by the encoding method or the bitstream generating method to which the present invention is applied and the streaming server may temporarily store the bitstream in the process of transmitting or receiving the bitstream.

The streaming server transmits multimedia data to the user device based on a user request through a web server, and the web server serves as an intermediary for informing a user of what service there is. When the user requests a desired service to the web server, the web server transfers the requested service to the streaming server and the streaming server transmits the multimedia data to the user. In this case, the content streaming system may include a separate control server and in this case, the control server serves to control a command/response between respective devices in the content streaming system.

The streaming server may receive contents from the media storage and/or the encoding server. For example, when the streaming server receives the contents from the encoding server, the streaming server may receive the contents in real time. In this case, the streaming server may store the bitstream for a predetermined time in order to provide a smooth streaming service.

Examples of the user device may include a cellular phone, a smart phone, a laptop computer, a digital broadcasting terminal, a personal digital assistants (PDA), a portable multimedia player (PMP), a navigation, a slate PC, a tablet PC, an ultrabook, a wearable device such as a smartwatch, a smart glass, or a head mounted display (HMD), etc., and the like.

Each server in the content streaming system may be operated as a distributed server and in this case, data received by each server may be distributed and processed.

As described above, the embodiments described in the present invention may be implemented and performed on a processor, a microprocessor, a controller, or a chip. For example, functional units illustrated in each drawing may be implemented and performed on a computer, the processor, the microprocessor, the controller, or the chip.

In addition, the decoder and the encoder to which the present invention may be included in a multimedia broadcasting transmitting and receiving device, a mobile communication terminal, a home cinema video device, a digital cinema video device, a surveillance camera, a video chat device, a real time communication device such as video communication, a mobile streaming device, storage media, a camcorder, a video on demand (VOD) service providing device, an (Over the top) OTT video device, an Internet streaming service providing devices, a 3 dimensional (3D) video device, a video telephone video device, a transportation means terminal (e.g., a vehicle terminal, an airplane terminal, a ship terminal, etc.), and a medical video device, etc., and may be used to process a video signal or a data signal. For example, the Over the top (OTT) video device may include a game console, a Blu-ray player, an Internet access TV, a home theater system, a smartphone, a tablet PC, a digital video recorder (DVR), and the like.

In addition, a processing method to which the present invention is applied may be produced in the form of a program executed by the computer, and may be stored in a computer-readable recording medium. Multimedia data having a data structure according to the present invention may also be stored in the computer-readable recording medium. The computer-readable recording medium includes all types of storage devices and distribution storage devices storing computer-readable data. The computer-readable recording medium may include, for example, a Blu-ray disc (BD), a universal serial bus (USB), a ROM, a PROM, an EPROM, an EEPROM, a RAM, a CD-ROM, a magnetic tape, a floppy disk, and an optical data storage device. Further, the computer-readable recording medium includes media implemented in the form of a carrier wave (e.g., transmission over the Internet). Further, the bitstream generated by the encoding method may be stored in the computer-readable recording medium or transmitted through a wired/wireless communication network.

In addition, the embodiment of the present invention may be implemented as a computer program product by a program code, which may be performed on the computer by the embodiment of the present invention. The program code may be stored on a computer-readable carrier.

In the embodiments described above, the components and the features of the present invention are combined in a predetermined form. Each component or feature should be considered as an option unless otherwise expressly stated. Each component or feature may be implemented not to be associated with other components or features. Further, the embodiment of the present invention may be configured by associating some components and/or features. The order of the operations described in the embodiments of the present invention may be changed. Some components or features of any embodiment may be included in another embodiment or replaced with the component and the feature corresponding to another embodiment. It is apparent that the claims that are not expressly cited in the claims are combined to form an embodiment or be included in a new claim by an amendment after the application.

The embodiments of the present invention may be implemented by hardware, firmware, software, or combinations thereof. In the case of implementation by hardware, according to hardware implementation, the exemplary embodiment described herein may be implemented by using one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

In the case of implementation by firmware or software, the embodiment of the present invention may be implemented in the form of a module, a procedure, a function, and the like to perform the functions or operations described above. A software code may be stored in the memory and executed by the processor. The memory may be positioned inside or outside the processor and may transmit and receive data to/from the processor by already various means.

It is apparent to those skilled in the art that the present invention may be embodied in other specific forms without departing from essential characteristics of the present invention. Accordingly, the aforementioned detailed description should not be construed as restrictive in all terms and should be exemplarily considered. The scope of the present invention should be determined by rational construing of the appended claims and all modifications within an equivalent scope of the present invention are included in the scope of the present invention.

INDUSTRIAL APPLICABILITY

Hereinabove, the preferred embodiments of the present invention are disclosed for an illustrative purpose and hereinafter, modifications, changes, substitutions, or additions of various other embodiments will be made within the technical spirit and the technical scope of the present invention disclosed in the appended claims by those skilled in the art.

The invention claimed is:

1. A method for decoding an image, the method comprising:
    obtaining a flag related to whether a transform skip is applied to a current block;
    acquiring a transform index indicating a combination of transform types applied to a horizontal direction and a vertical direction of the current block based on the flag specifying that the transform is applied to the current block;
    performing inverse transform on coefficients of the current block based on the combination of the transform types indicated by the transform index to generate residual samples of the current block; and
    generating reconstructed samples of the current block based on the residual samples,
    wherein different transform types are applied to the horizontal direction and the vertical direction, or the same transform types are applied to the horizontal direction and the vertical direction, and
    wherein the transform index is binarized based on a truncated unary method.

2. The method of claim 1, wherein the performing the inverse transform comprises:
    determining a region in the current block to which transform has been applied based on the combination of the transform types indicated by the transform index and a size of the current block; and
    performing the inverse transform on the region based on the combination of the transform types indicated by the transform index.

3. The method of claim 1, wherein the transform index indicates one of combinations comprising two transform types selected among a plurality of predefined transform types.

4. The method of claim 1, wherein the transform index indicates one among combinations of transform types defined in an intra mode group to which an intra prediction mode of the current block belongs, when intra prediction modes are grouped into a plurality of intra mode groups based on a prediction direction.

5. A method for encoding an image, the method comprising:
    generating a residual block of a current block based on a prediction block of the current block;

determining whether to apply a transform to the residual block;

generating a transform index indicating a combination of transform types applied to a horizontal direction and a vertical direction of the residual block based on that it is determined that the transform is applied to the residual block;

performing the transform on the residual block based on the combination of the transform types indicated by the transform index; and binarizing the transform index based on a truncated unary method, and wherein different transform types are applied to the horizontal direction and the vertical direction, or the same transform types are applied to the horizontal direction and the vertical direction.

6. The method of claim 5, wherein the performing the transform comprises:

determining a region in the residual block to which the transform is to be applied based on the combination of the transform types indicated by the transform index and a size of the current block; and performing the transform on the region based on the combination of the transform types indicated by the transform index.

7. The method of claim 5, wherein the transform index indicates one of combinations comprising two transform types selected among a plurality of predefined transform types.

8. The method of claim 5, wherein the transform index indicates one among combinations of transform types defined in an intra mode group to which an intra prediction mode of the current block belongs, when intra prediction modes are grouped into a plurality of intra mode groups based on a prediction direction.

9. A method comprising:

generating a bitstream for a transform index binarized based on a truncated unary method, the transform index indicating a combination of transform types applied to a horizontal direction and a vertical direction of a residual block of a current block; and transmitting the bitstream, wherein the residual block of the current block is generated based on a prediction block of the current block, wherein whether a transform is applied to the residual block is determined, wherein the transform index is generated based on that it is determined that the transform is applied to the residual block, and wherein the transform on the residual block is performed based on the combination of the transform types indicated by the transform index, wherein different transform types are applied to the horizontal direction and the vertical direction, or the same transform types are applied to the horizontal direction and the vertical direction.

* * * * *